United States Patent
Ahn et al.

(10) Patent No.: US 12,206,103 B2
(45) Date of Patent: Jan. 21, 2025

(54) IRON OXYHYDROXYNITRATE HAVING PHOSPHORIC ACID ANION-ADSORBED SURFACE, PREPARATION METHOD THEREFOR, CATHODE COMPRISING IRON OXYHYDROXYNITRATE HAVING PHOSPHORIC ACID ANION-ADSORBED SURFACE FOR LITHIUM SECONDARY BATTERY, AND LITHIUM SECONDARY BATTERY COMPRISING SAME

(71) Applicant: LG ENERGY SOLUTION, LTD., Seoul (KR)

(72) Inventors: Jihoon Ahn, Daejeon (KR); Yun Kyoung Kim, Daejeon (KR); Taek Gyoung Kim, Daejeon (KR); Eun Kyoung Park, Daejeon (KR); Suenghoon Han, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 553 days.

(21) Appl. No.: 17/608,336

(22) PCT Filed: Jul. 1, 2020

(86) PCT No.: PCT/KR2020/008555
§ 371 (c)(1),
(2) Date: Nov. 2, 2021

(87) PCT Pub. No.: WO2021/029534
PCT Pub. Date: Feb. 18, 2021

(65) Prior Publication Data
US 2022/0223860 A1    Jul. 14, 2022

(30) Foreign Application Priority Data

Aug. 13, 2019    (KR) .................. 10-2019-0098681
Aug. 13, 2019    (KR) .................. 10-2019-0098694
Jun. 26, 2020    (KR) .................. 10-2020-0078154

(51) Int. Cl.
*H01M 4/52*      (2010.01)
*C01G 49/00*     (2006.01)
(Continued)

(52) U.S. Cl.
CPC ............ *H01M 4/523* (2013.01); *C01G 49/00* (2013.01); *H01M 10/0525* (2013.01);
(Continued)

(58) Field of Classification Search
CPC .. H01M 4/523; H01M 10/0525; H01M 4/622; H01M 2004/028; C01G 49/00; C01P 2004/61; C01P 2006/40
(Continued)

(56) References Cited

U.S. PATENT DOCUMENTS

2002/0045102 A1    4/2002   Jung et al.
2004/0048154 A1    3/2004   Jung et al.
(Continued)

FOREIGN PATENT DOCUMENTS

CN    104577080 A    4/2015
CN    106082351 B    4/2018
(Continued)

OTHER PUBLICATIONS

Silva et al., Magnetic and Structural Properties of Iron Oxyhydroxynitrate Nanoparticles, Apr. 18, 2008, NanoSpain2008 (Year: 2008).*
(Continued)

*Primary Examiner* — Christian Roldan
*Assistant Examiner* — Robert Gene West
(74) *Attorney, Agent, or Firm* — Birch, Stewart, Kolasch & Birch, LLP

(57) ABSTRACT

Disclosed is a modified iron oxyhydroxynitrate including iron oxyhydroxynitrate and hydrogen phosphate ions
(Continued)

adsorbed on a surface thereof. Also disclosed is a method for preparing the same, a positive electrode for a lithium secondary battery including the modified iron oxyhydroxynitrate as a positive electrode additive, and a lithium secondary battery including the same.

15 Claims, 7 Drawing Sheets

(51) Int. Cl.
  *H01M 4/02* (2006.01)
  *H01M 4/62* (2006.01)
  *H01M 10/0525* (2010.01)
(52) U.S. Cl.
  CPC ...... *C01P 2004/61* (2013.01); *C01P 2006/40* (2013.01); *H01M 2004/028* (2013.01); *H01M 4/622* (2013.01)
(58) Field of Classification Search
  USPC .......................................................... 429/221
  See application file for complete search history.

(56) References Cited

U.S. PATENT DOCUMENTS

| | | | |
|---|---|---|---|
| 2004/0096380 | A1 | 5/2004 | Steenwinkel et al. |
| 2006/0166040 | A1 | 7/2006 | Konno et al. |
| 2009/0028770 | A1 | 1/2009 | Mae et al. |
| 2011/0037030 | A1 | 2/2011 | Holzapfel et al. |
| 2011/0123863 | A1 | 5/2011 | Choi et al. |
| 2013/0065127 | A1 | 3/2013 | Nazar et al. |
| 2014/0361226 | A1 | 12/2014 | Takada et al. |
| 2018/0244900 | A1* | 8/2018 | Gomez Cordon ....... C09D 5/24 |
| 2018/0282177 | A1 | 10/2018 | Kimura et al. |
| 2019/0181449 | A1 | 6/2019 | Han et al. |
| 2021/0175501 | A1 | 6/2021 | Han et al. |

FOREIGN PATENT DOCUMENTS

| | | | | |
|---|---|---|---|---|
| CN | 109792039 | A | | 5/2019 |
| CN | 110085793 | A | * 8/2019 | ........ H01M 10/0525 |
| EP | 3 490 038 | A1 | | 5/2019 |
| JP | 58-64225 | A | | 4/1983 |
| JP | 2000-124085 | A | | 4/2000 |
| JP | 2002-140814 | A | | 5/2002 |
| JP | 2002-248348 | A | | 9/2002 |
| JP | 2003-135579 | A | | 5/2003 |
| JP | 2005-281128 | A | | 10/2005 |
| JP | 2006-107763 | A | | 4/2006 |
| JP | 2006-124239 | A | | 5/2006 |
| JP | 5883826 | B2 | | 3/2016 |
| JP | 2016-103439 | A | | 6/2016 |
| JP | 6035669 | B2 | | 11/2016 |
| JP | 2021-508919 | A | | 3/2021 |
| KR | 10-270077 | B1 | | 10/2000 |
| KR | 10-2002-0011563 | A | | 2/2002 |
| KR | 10-2004-0023257 | A | | 3/2004 |
| KR | 10-2006-0054515 | A | | 5/2006 |
| KR | 10-1093697 | B1 | | 12/2011 |
| KR | 10-2013-0113423 | A | | 10/2013 |
| KR | 10-2014-0116397 | A | | 10/2014 |
| KR | 10-2016-0121833 | A | | 10/2016 |
| KR | 10-2017-0001374 | A | | 1/2017 |
| KR | 10-2017-0067081 | A | | 6/2017 |
| KR | 10-2017-0082280 | A | | 7/2017 |
| KR | 10-2018-0138133 | A | | 12/2018 |
| WO | WO 2005/004116 | A1 | | 1/2005 |
| WO | WO 2008/088083 | A1 | | 8/2006 |
| WO | WO 2017/109014 | A1 | | 6/2017 |
| WO | WO 2018/236060 | A1 | | 12/2018 |

OTHER PUBLICATIONS

Extended European Search Report for European Application No. 20851716.9, dated Jun. 24, 2022.
Bourlinos et al., "One-pot Borohydride Synthesis of Magnetically Modified Lepidocrocite", Chemistry Letters, 2005, vol. 34, No. 5, pp. 666-667.
International Search Report for PCT/KR2020/008555 mailed on Oct. 8, 2020.
Jia et al., "Facile one-pot synthesis of lepidocrocite (γ-FeOOH) nanoflakes for water treatment", New J. Chem., 2013, vol. 37, pp. 2551-2556.
Schwertmann et al., "A New Iron(III) Oxyhydroxynitrate", Journal of Solid State Chemistry, 1996, vol. 126, No. 0346, p. 336.
Silva et al., "Magnetic and Structural Properties of Iron Oxyhydroxynitrate Nanoparticles", NanoSpain 2008, Nanoiberian Conference, Apr. 14-18, 2008, Braga, Portugal, total 2 pages.
Silva et al., "Magnetic behavior of iron (III) oxyhydroxy nanoparticles in organic-inorganic hybrid matrices", Journal of Magnetism and Magnetic Materials, 2005, vol. 290-291, pp. 962-965.

* cited by examiner

[Figure 1]
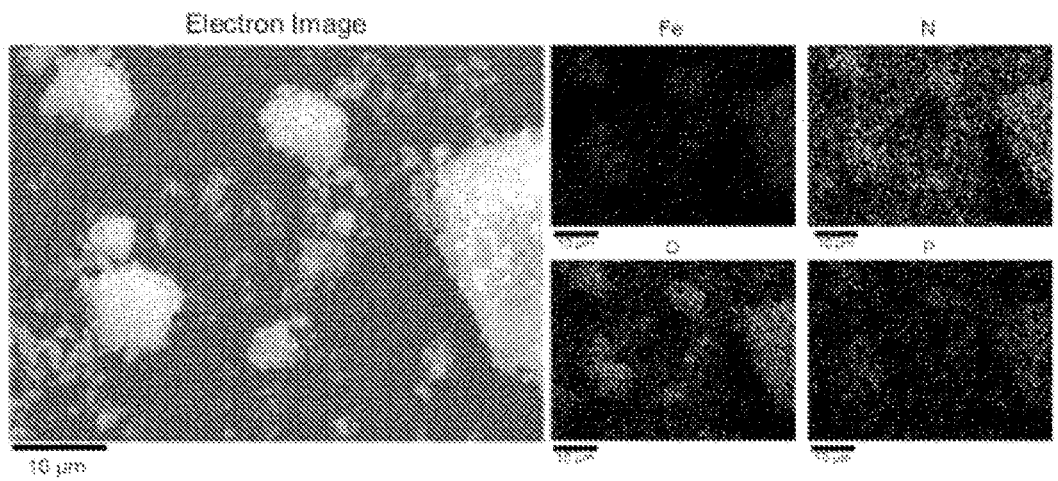
[Figure 2]
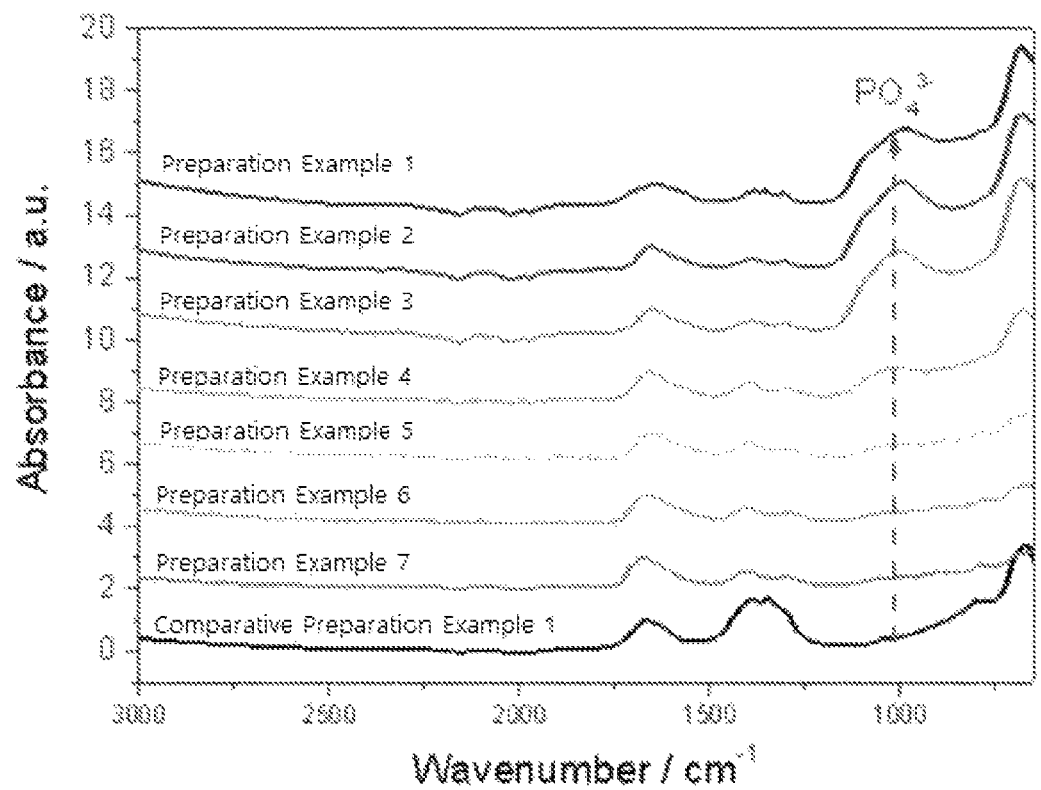

[Figure 3]
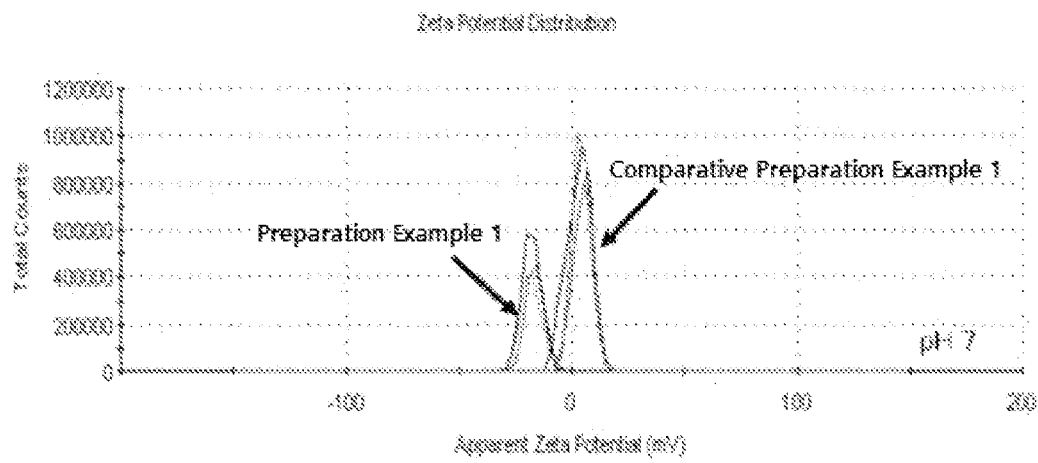
[Figure 4]
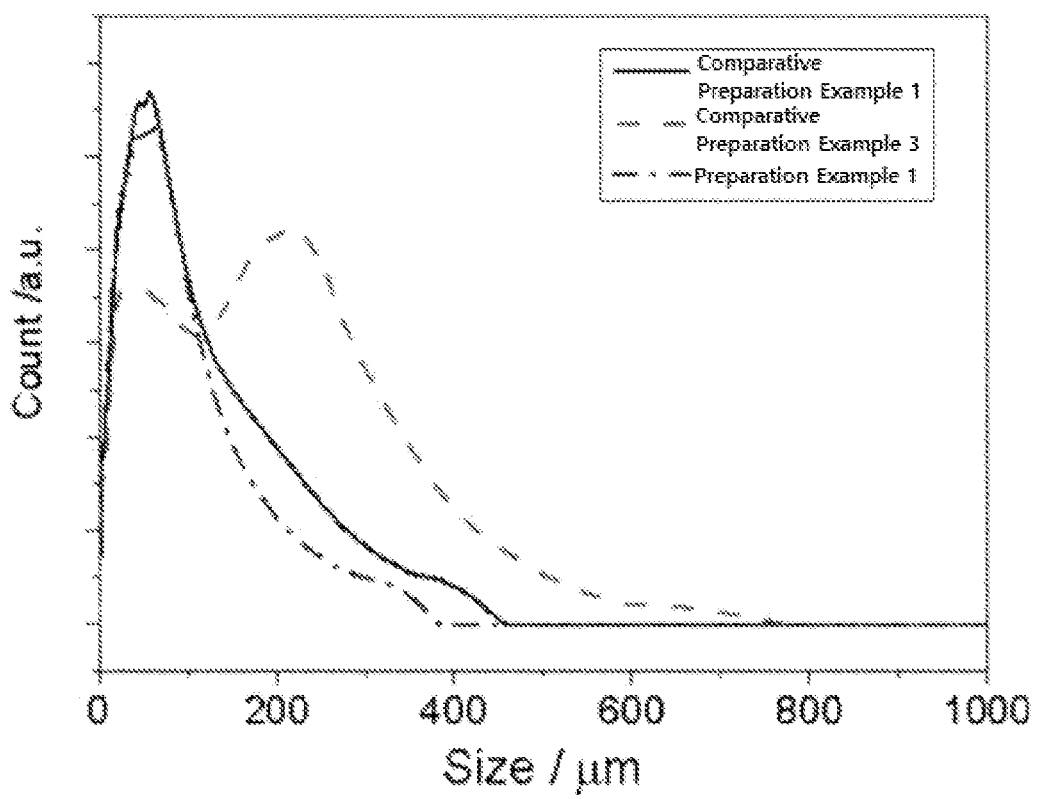

【Figure 5】
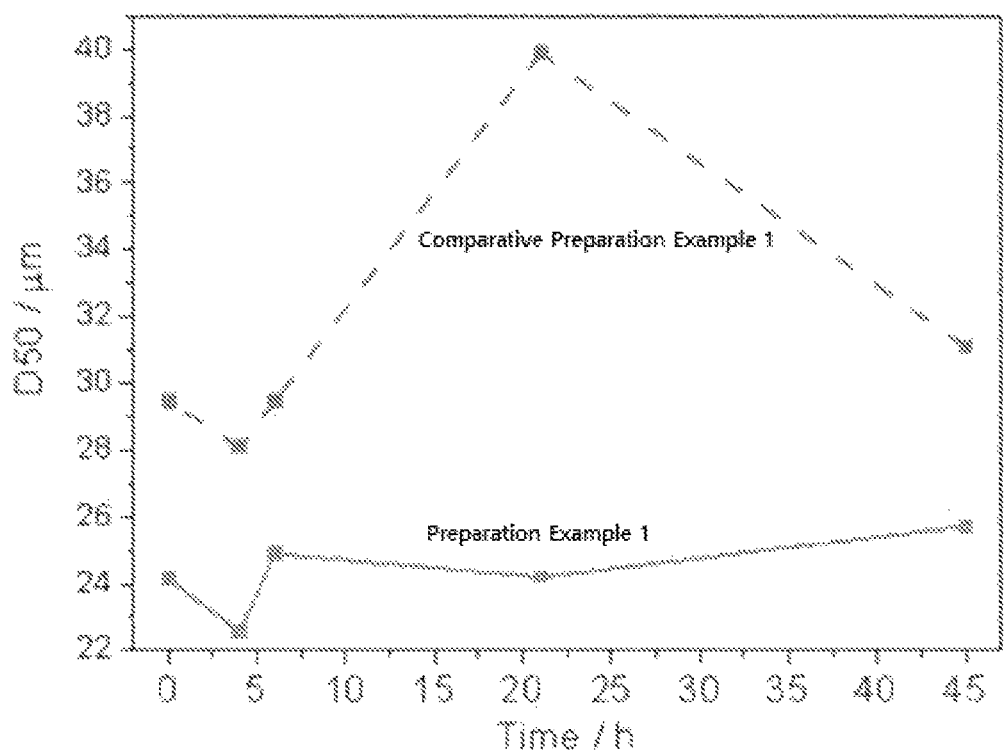
【Figure 6】
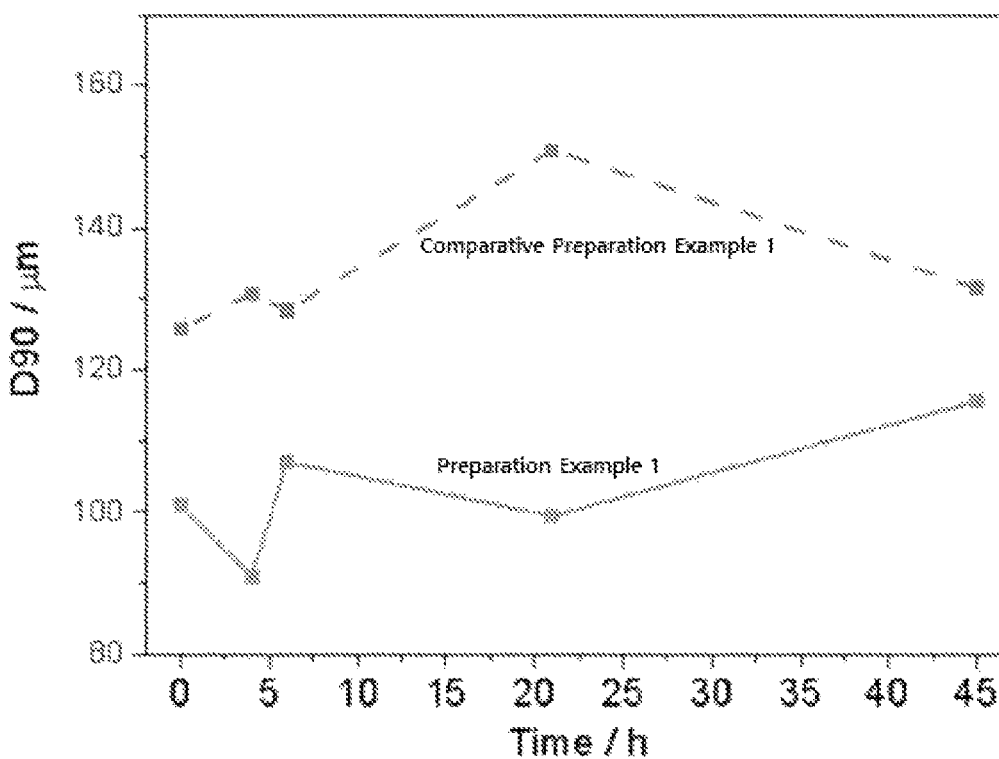

[Figure 7]
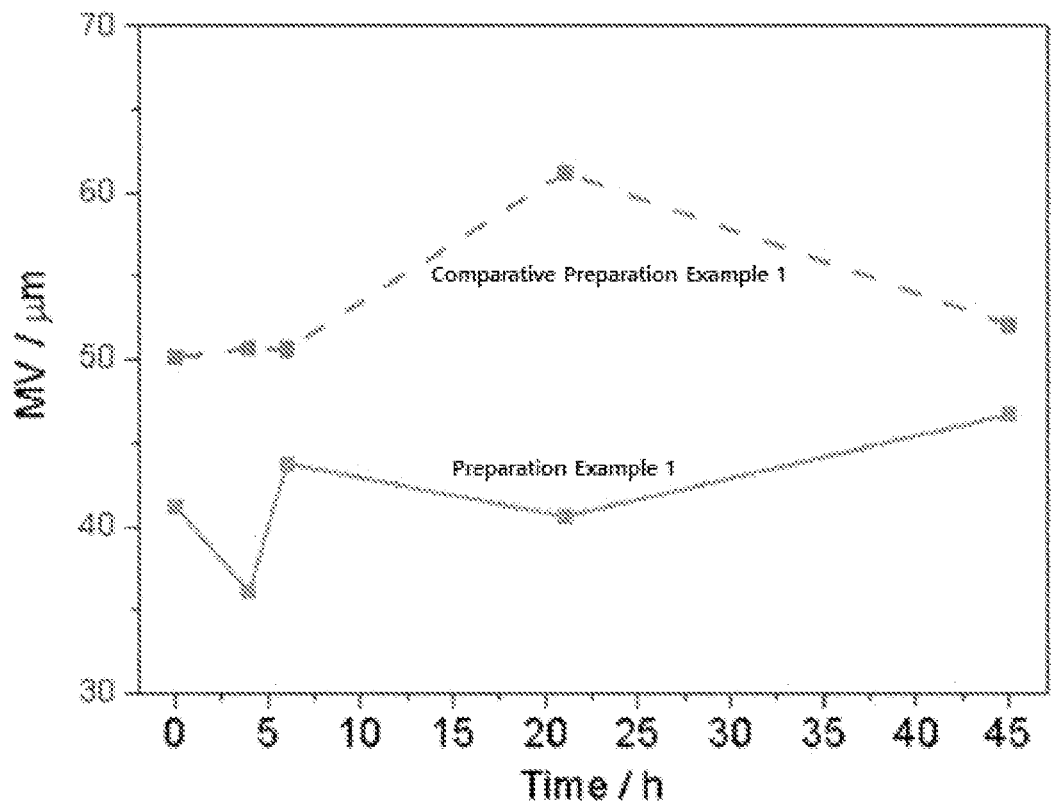
[Figure 8]
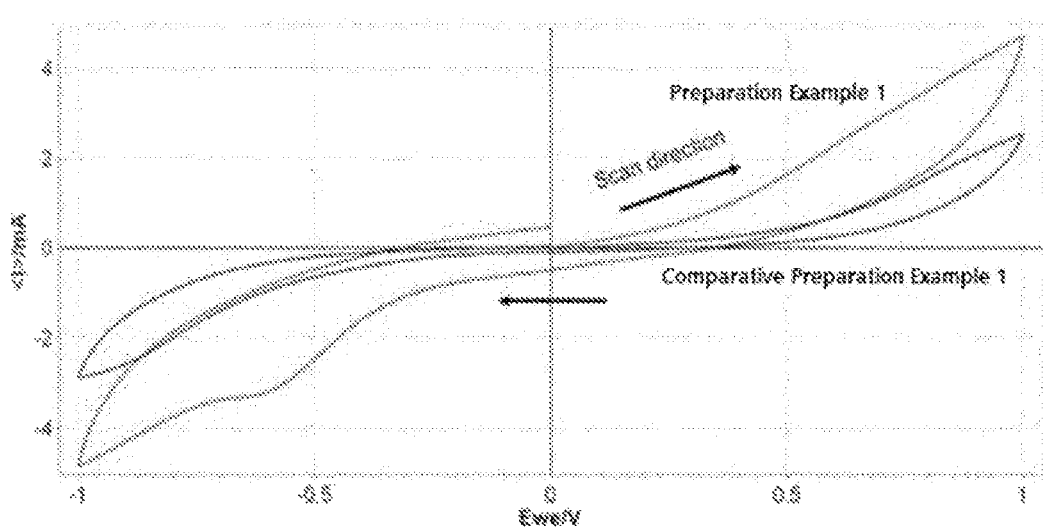

[Figure 9]
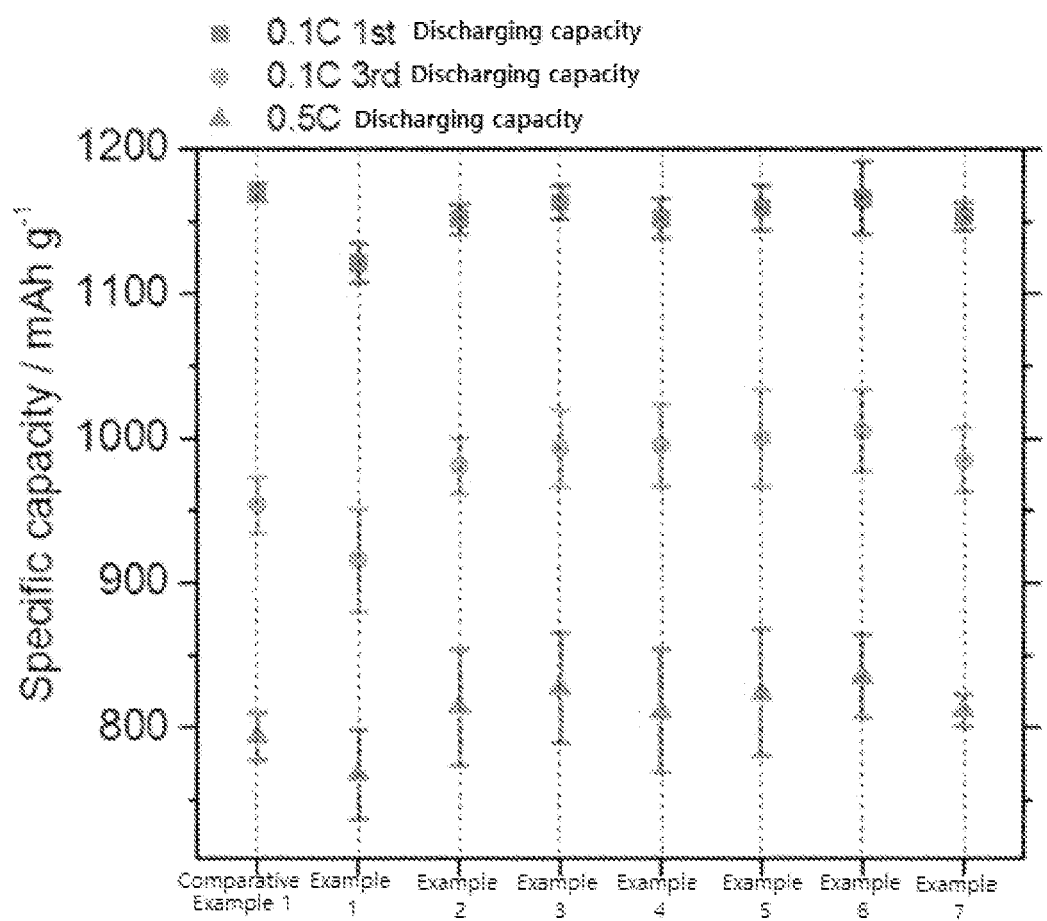

[Figure 10]
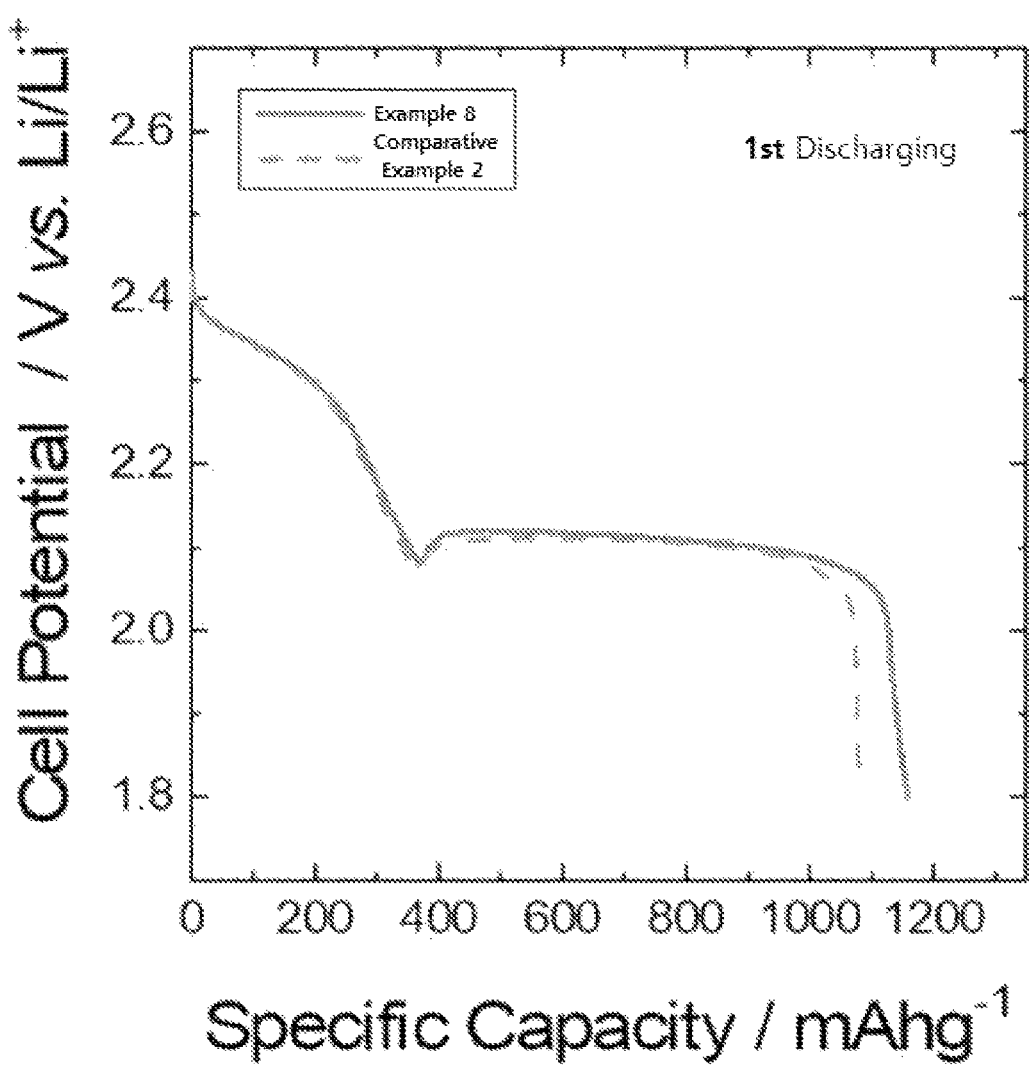

[Figure 11]
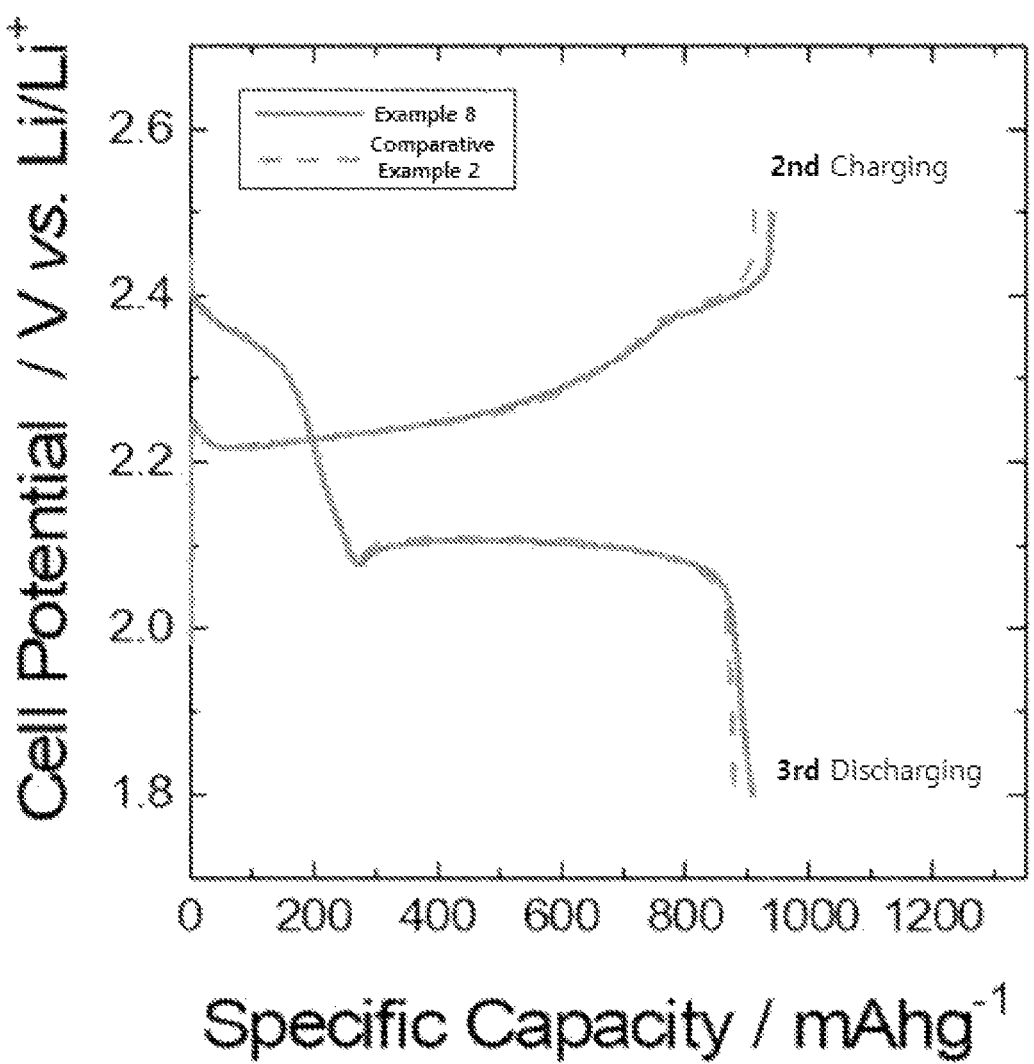

IRON OXYHYDROXYNITRATE HAVING PHOSPHORIC ACID ANION-ADSORBED SURFACE, PREPARATION METHOD THEREFOR, CATHODE COMPRISING IRON OXYHYDROXYNITRATE HAVING PHOSPHORIC ACID ANION-ADSORBED SURFACE FOR LITHIUM SECONDARY BATTERY, AND LITHIUM SECONDARY BATTERY COMPRISING SAME

TECHNICAL FIELD

The present application claims the benefit of priorities based on Korean Patent Application No. 10-2019-0098681 filed on Aug. 13, 2019, Korean Patent Application No. 10-2019-0098694 filed on Aug. 13, 2019, and Korean Patent Application No. 10-2020-0078154 filed on Jun. 26, 2020, all the contents of which are incorporated herein by reference.

The present invention relates to an iron oxyhydroxynitrate with hydrogen phosphate ions adsorbed on its surface, a method for preparing the same, a positive electrode for a lithium secondary battery comprising the iron oxyhydroxynitrate with hydrogen phosphate ions adsorbed on its surface as a positive electrode additive, and a lithium secondary battery comprising the same.

BACKGROUND ART

A lithium secondary battery is basically composed of materials such as a positive electrode, an electrolyte, a negative electrode and the like, and since the material of the positive electrode and the negative electrode among them determines the capacity of the battery, the lithium ion secondary battery is limited in capacity due to the material limitations of the positive electrode and the negative electrode. Particularly, since secondary batteries to be used in applications such as electric vehicles and plug-in hybrid electric vehicles (PHEVs) must be used as long as possible after one charging, the discharging capacity of the secondary batteries is very important. The biggest limitation in the sales of electric vehicles is that the distance that can be driven after one charging is much shorter than that of ordinary gasoline engines.

The capacity limitation of such lithium secondary battery is difficult to completely solve due to the structure and material limitations of the lithium secondary battery despite much effort. Therefore, in order to fundamentally solve the capacity problem of the lithium secondary battery, it is required to develop a new concept of secondary battery that goes beyond the concept of the existing secondary battery.

The lithium-sulfur battery is a new high capacity and low-cost battery system which goes beyond capacity limits determined by the intercalation/deintercalation reaction of lithium ions to the layered structure of the metal oxide and graphite which is the basic principle of existing lithium ion secondary battery, and which can lead to replacement of transition metals and cost savings.

The lithium-sulfur battery has a theoretical capacity of 1,675 mAh/g derived from a conversion reaction of lithium ion and sulfur ($S_8 + 16Li^+ + 16e^- \rightarrow 8Li_2S$) in the positive electrode, and the negative electrode enables the battery system to have very high capacity using lithium metal (theoretical capacity: 3,860 mAh/g). Also, since the discharging voltage is about 2.2 V, the theoretical energy density is 2,600 Wh/kg based on the amount of the positive electrode and the negative electrode active material. These values are 6 to 7 times higher than the energy theoretical energy density of 400 Wh/kg of commercially available lithium secondary battery ($LiCoO_2$/graphite) which uses layered metal oxides and graphite.

However, the major problem associated with the lithium-sulfur battery is the dissolution of lithium polysulfide into the electrolyte, which is the intermediate product of sulfur generated during discharging. As the discharging is proceeded, sulfur ($S_8$) continuously reacts with lithium ions and thus the phases thereof are continuously changed into $S_8 \rightarrow Li_2S_8 \rightarrow (Li_2S_6) \rightarrow Li_2S_4 \rightarrow Li_2S_2 \rightarrow Li_2S$ or the like, and among them, $Li_2S_8$, $Li_2S_4$ (lithium polysulfide) and the like, which are long chains of sulfur, have a property of easily dissolving in a general electrolyte used in a lithium ion battery.

When these reactions occur, not only the reversible positive electrode capacity is greatly reduced but also the dissolved lithium polysulfide diffuses into the negative electrode and causes various side reactions. The lithium polysulfide causes a shuttle reaction especially during the charging process, and as a result, the charging capacity is continuously increased, and the charging/discharging efficiency is rapidly deteriorated. Recently, in order to solve such a problem, as one of various methods, a method of improving the characteristics of the positive electrode has been proposed.

The method of improving the properties of the positive electrode is a method of forming a coating layer on the surface of the positive electrode particles to prevent the dissolution of the polysulfide, adding a porous material capable of capturing the dissolved polysulfide or so on. Typically, a method of coating the surface of a positive electrode structure containing a sulfur particle with a conductive polymer, a method of coating the surface of a positive electrode structure with a metal oxide on which lithium ions are transferred, a method of adding a porous metal oxide having a large specific surface area and a large pore size to a positive electrode, which is capable of absorbing a large amount of lithium polysulfide, a method of attaching a functional group capable of adsorbing lithium polysulfide onto the surface of a carbon structure, a method of wrapping sulfur particles using graphene or graphene oxide, or the like was proposed.

Although such efforts are under way, these methods are not only somewhat complicated, but also have a problem that the amount of sulfur that can be added, which is an active material, is limited. In particular, in the case of a method of adding a metal oxide to the positive electrode, agglomeration phenomenon between the binder and the metal oxide may occur by interacting with a binder having a carboxylate (—COO$^-$) functional group, which may cause problems such as non-uniform distribution of metal oxides, deterioration of processability and storage of positive electrode, and weakening of adhesion force of electrodes.

PRIOR ART DOCUMENT

Patent Documents

Japanese Laid-open Patent Publication No. 2002-248348
Korean Laid-open Patent Publication No. 10-2006-0054515

DISCLOSURE

Technical Problem

The inventors of the present invention have conducted various studies to solve the above problems, and as a result, have confirmed that when hydrogen phosphate ions are adsorbed on the surface of high purity iron oxyhydroxynitrate used as a positive electrode additive, hydrogen phosphate ions ($HPO_4^{2-}$) and a carboxylate (—$COO^-$) functional group of the binder repel each other, thereby alleviating the agglomeration phenomenon between the binder and the additive, and enhancing the adhesion force of the positive electrode for a lithium secondary battery, without adversely affecting the lifetime characteristics and discharging capacity of the lithium secondary battery.

Therefore, it is an object of the present invention to provide an iron oxyhydroxynitrate with hydrogen phosphate ions adsorbed on its surface and a method for preparing the same.

In addition, it is another object of the present invention to provide a positive electrode for a lithium secondary battery comprising the iron oxyhydroxynitrate with hydrogen phosphate ions adsorbed on its surface as a positive electrode additive.

In addition, it is still another object of the present invention to provide a lithium secondary battery comprising the positive electrode for the lithium secondary battery.

Technical Solution

In order to achieve the above objects, the present invention provides iron oxyhydroxynitrate of Formula 1 below with hydrogen phosphate ion ($HPO_4^{2-}$) adsorbed on its surface:

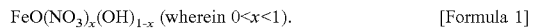

FeO(NO$_3$)$_x$(OH)$_{1-x}$ (wherein 0<$x$<1).   [Formula 1]

In addition, the present invention provides a method for preparing iron oxyhydroxynitrate with hydrogen phosphate ion ($HPO_4^{2-}$) adsorbed on its surface comprising the steps of,
(1) preparing a Fe(NO$_3$)$_3$·9H$_2$O solution by dissolving Fe(NO$_3$)$_3$·9H$_2$O in a mixed solvent of an aqueous solvent and an organic solvent;
(2) drying the Fe(NO$_3$)$_3$·9H$_2$O solution to obtain iron oxyhydroxynitrate of the following Formula 1;
(3) preparing an aqueous phosphoric acid solution having a pH of 6 to 12;
(4) preparing a mixed solution by mixing the iron oxyhydroxynitrate of Formula 1 obtained above with the aqueous phosphoric acid solution having a pH of 6 to 12; and
(5) recovering and drying the solid material after the reaction of the mixed solution is completed:

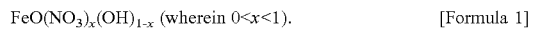

FeO(NO$_3$)$_x$(OH)$_{1-x}$ (wherein 0<$x$<1).   [Formula 1]

In addition, the present invention provides a positive electrode for a lithium secondary battery comprising a positive electrode current collector; and a positive electrode active material layer located on at least one side of the positive electrode current collector,
wherein the positive electrode active material layer comprises a positive electrode active material, an electrically conductive material, a binder and an additive, wherein the binder contains a carboxylate group, and wherein the additive comprises the iron oxyhydroxynitrate described above.

In addition, the present invention provides a lithium secondary battery comprising a positive electrode; a negative electrode; a separator interposed between the positive electrode and the negative electrode; and an electrolyte solution, wherein the positive electrode is the positive electrode of the present invention.

Advantageous Effects

The iron oxyhydroxynitrate with hydrogen phosphate ions adsorbed on its surface of the present invention can alleviate the agglomeration phenomenon between the binder and the additive because the hydrogen phosphate ion on its surface and the carboxylate (—$COO^-$) functional group of the binder repel each other, and thus can be uniformly distributed in the positive electrode, when used as a positive electrode additive, and can improve the adhesion force of the positive electrode active material layer to the positive electrode current collector.

In addition, the positive electrode for a lithium secondary battery comprising the iron oxyhydroxynitrate with hydrogen phosphate ions adsorbed on its surface and the binder containing the carboxylate functional group has excellent manufacturing processability and storage performance and has an excellent effect in the adhesion force with the current collector.

DESCRIPTION OF DRAWINGS

FIG. 1 is a result of SEM-EDS analysis of Preparation Example 1.

FIG. 2 is a FT-IR graph of Preparation Examples 1 to 7 and Comparative Preparation Example 1.

FIG. 3 is a graph of the zeta potential of Preparation Example 1 and Comparative Preparation Example 1.

FIG. 4 is a particle size distribution graph of Experimental Example 2.

FIG. 5 is a particle size ($D_{50}$) graph of Experimental Example 2 over time.

FIG. 6 is a particle size ($D_{90}$) graph of Experimental Example 2 over time.

FIG. 7 is a particle size graph of Experimental Example 2 over time.

FIG. 8 is a graph from Cyclic voltammetry (CV) of Experimental Example 3.

FIG. 9 is a graph of discharging capacity of the lithium-sulfur battery of Experimental Example 5.

FIGS. 10 and 11 are graphs of discharging capacity of the lithium-sulfur battery of Experimental Example 6.

BEST MODE

Hereinafter, the present invention will be described in more detail.

Iron oxyhydroxynitrate was used as a positive electrode additive for a lithium secondary battery, preferably a lithium-sulfur battery.

The iron oxyhydroxynitrate can adsorb the lithium polysulfide, and thus can reduce the problem that the lithium polysulfide is transferred to the negative electrode, thereby reducing the lifetime of the lithium secondary battery, and can suppress the reduced reactivity due to the lithium polysulfide, thereby increasing the discharging capacity of the lithium secondary battery and improving lifetime characteristics.

In addition, the binder used for the positive electrode for lithium secondary batteries is a compound mainly containing a carboxylate (—$COO^-$) functional group, and the carboxylate can interact with the surface of the iron oxyhydroxynitrate, which is a transition metal oxide. Therefore, when forming a positive electrode active material layer by applying a slurry composition for forming a positive electrode active material layer in a slurry form on at least one surface of the current collector, there is a problem that the agglomeration phenomenon between the binder and iron oxyhydroxynitrate occurs, and thus iron oxyhydroxynitrate is distributed non-uniformly in the positive electrode, and manufacturing process and storage of the positive electrode are deteriorated. In addition, as iron oxyhydroxynitrate is agglomerated with the binder, there is a problem that it is difficult for the binder to perform the role of the binder, and thus the adhesion force between the current collector and the positive electrode active material layer is weakened, and the positive electrode active material layer is detached, and so on.

Therefore, in the present invention, in order to solve the above problems, it was intended to solve the agglomeration phenomenon between the binder and the additive by adsorbing hydrogen phosphate ion on the surface of iron oxyhydroxynitrate, and weakening the interaction by causing the surface of hydrogen phosphate ion ($HPO_4^{2-}$) and the carboxylate (—$COO^-$) of the binder to repel each other, and thus improve the adhesion force of the positive electrode active material layer to the current collector without reducing the lifetime characteristics and discharging capacity of the lithium secondary battery.

Iron Oxyhydroxynitrate with Hydrogen Phosphate Ion ($HPO_4^{2-}$) Adsorbed on its Surface That is, the present invention relates to an iron oxyhydroxynitrate of Formula 1 below with hydrogen phosphate ions ($HP_4^{2-}$) adsorbed on its surface:

$FeO(NO_3)_x(OH)_{1-x}$ (wherein 0<x<1). [Formula 1]

On the surface of iron oxyhydroxynitrate of Formula 1, hydrogen phosphate ion is adsorbed as a monolayer, which means that the surface of iron oxyhydroxynitrate is modified by hydrogen phosphate ion. In addition, since hydrogen phosphate ion was adsorbed as a monolayer on the surface of iron oxyhydroxynitrate, it can be seen that a coating layer containing hydrogen phosphate ion was formed on the surface of iron oxyhydroxynitrate. If hydrogen phosphate ion is formed as a monolayer rather than composed of a nm-thick multilayer, when iron oxyhydroxynitrate with hydrogen phosphate ions adsorbed on its surface is applied to lithium-sulfur battery as a (positive electrode) additive, the polysulfide may be easily accessed to the surface of iron oxyhydroxynitrate, and thus the polysulfide may be easily adsorbed.

The hydrogen phosphate ion may be $HPO_4^{2-}$ among $H_2PO_4^-$, $HPO_4^{2-}$, and $PO_4^{3-}$.

Among several anions, the hydrogen phosphate ion has a strong binding force with iron ions exposed on the surface of iron oxyhydroxynitrate, which is an iron oxide-based material, and thus, a site where the carboxylate functional group (included in the binder) can bind can be removed. In addition, the surface of iron oxyhydroxynitrate with hydrogen phosphate ions adsorbed on its surface has an isoelectric point (IEP) of 5 or less, so that the surface has a negative charge in a neutral and aqueous basic solution, and thus can repel the carboxylate functional group. Therefore, the agglomeration phenomenon with the binder containing the carboxylate functional group can be solved, thereby improving the adhesion force between the current collector and the positive electrode active material layer.

The average particle diameter of iron oxyhydroxynitrate of Formula 1 may be 1 to 200 μm, preferably 10 to 100 μm, and more preferably 20 to 40 μm. Within this range, as the average particle diameter of the particles decreases, it is suitable for use as a positive electrode additive for lithium secondary batteries, preferably lithium-sulfur batteries. If the average particle diameter of the particles exceeds the above range, the particle size may be too large to be suitable as a positive electrode additive for a lithium-sulfur battery.

As will be described later, the iron oxyhydroxynitrate with hydrogen phosphate ions adsorbed on its surface may be an additive for a positive electrode for a lithium secondary battery, preferably an additive for a positive electrode for a lithium-sulfur battery. Therefore, the agglomeration phenomenon between the binder and the additive can be solved because the carboxylate of the binder containing the carboxylate functional group for the positive electrode and the hydrogen phosphate ion on the surface of iron oxyhydroxynitrate repel each other. Therefore, the iron oxyhydroxynitrate with hydrogen phosphate ions adsorbed on its surface can be uniformly distributed in the positive electrode, and improve the manufacturing processability and storage properties of the positive electrode and the adhesion force with the current collector.

Method for Preparing Iron Oxyhydroxynitrate with Hydrogen Phosphate Ions Adsorbed on its Surface In addition, the present invention relates to a method for preparing an iron oxyhydroxynitrate with hydrogen phosphate ions ($HPO_4^{2-}$) adsorbed on its surface comprising the steps of, (1) preparing a $Fe(NO_3)_3 \cdot 9H_2O$ solution by dissolving $Fe(NO_3)_3 \cdot 9H_2O$ in a mixed solvent of an aqueous solvent and an organic solvent;

(2) drying the $Fe(NO_3)_3 \cdot 9H_2O$ solution to obtain iron oxyhydroxynitrate of the following Formula 1;

(3) preparing an aqueous phosphoric acid solution having a pH of 6 to 12;

(4) preparing a mixed solution by mixing the iron oxyhydroxynitrate of Formula 1 obtained above with the aqueous phosphoric acid solution having a pH of 6 to 12; and (5) recovering and drying the solid material after the reaction of the mixed solution is completed:

$FeO(NO_3)_x(OH)_{1-x}$ (wherein 0<x<1). [Formula 1]

Step (1) is a step of preparing a solution of $Fe(NO_3)_3 \cdot 9H_2O$ by dissolving $Fe(NO_3)_3 \cdot 9H_2O$ in a mixed solvent of an aqueous solvent and an organic solvent.

The aqueous solvent may be water, preferably secondary distilled water (DW), or tertiary distilled deionzied water (DIW). In addition, the organic solvent may be at least one selected from the group consisting of methanol, ethanol, n-propanol, isopropanol, n-butanol, sec-butanol, and tert-butanol, preferably ethanol.

The aqueous solvent and the organic solvent may be mixed in a weight ratio of 30:70 to 70:30, specifically in a weight ratio of 40:60 to 60:40, preferably in a weight ratio of 50:50.

If the ratio of the aqueous solvent exceeds the above range, iron oxyhydroxynitrate represented by Formula 1 may not be generated. Therefore, the aqueous solvent and the organic solvent should be mixed and used in the above range.

In addition, the concentration of the $Fe(NO_3)_3 \cdot 9H_2O$ solution may be 0.5 to 2.5M, and preferably 1.5 to 2 M. If the concentration of the solution is less than 0.5 M, the evaporation rate of the solution is slow, so that crystals of iron oxyhydroxynitrate produced may be large or the production yield may be lowered. If the concentration of the solution exceeds 2.5 M, iron oxyhydroxynitrate produced is likely to clump together, so it is not preferable to apply it as an additive for a positive electrode for a lithium secondary battery.

Step (2) is a step of preparing the iron oxyhydroxynitrate represented by Formula 1 by drying the $Fe(NO_3)_3 \cdot 9H_2O$ solution prepared in step (1). The term 'drying' is performed under conditions above a certain temperature, and may comprise the meanings of 'heat treatment' and the like.

The drying may be performed at 70 to 90° C., preferably 75 to 85° C. In addition, the drying may be performed for 18 to 36 hours in the above temperature range, preferably 20 to 30 hours. If the drying temperature is lower than the above temperature or the drying time is short, since excess moisture may remain in $Fe(NO_3)_3 \cdot 9H_2O$, which is a reactant, and then the moisture may evaporates unevenly in the drying process or a reaction residue remains, thus the iron oxyhydroxynitrate represented by Formula 1 according to the present invention may not be synthesized.

In addition, if the drying temperature exceeds the above temperature or the drying time is long, after all the water in $Fe(NO_3)_3 \cdot 9H_2O$ which is a reactant evaporates, the oxidation reaction by drying may be partially performed. In this case, a non-uniform oxidation reaction may occur through the drying process, and the size of the generated particles may be increased and expressed in a clumped shape, so that the iron oxyhydroxynitrate according to Formula 1 of the physical properties desired in the present invention may not be synthesized.

For example, when preparing the iron oxyhydroxynitrate according to the present invention, if an aqueous solvent exceeding the above range is used, and drying is performed at a temperature exceeding the above range (for example, 140 to 160° C.), $Fe_xO_3$ (wherein $1.7<x<2.0$) may be generated instead of the iron oxyhydroxynitrate represented by Formula 1. Also, if an organic solvent exceeding the above range is used, and drying is performed at a temperature exceeding the above range (for example, 140 to 160° C.), since $Fe_2O_3$ may be generated instead of the iron oxyhydroxynitrate represented by Formula 1, the drying temperature is appropriately adjusted within the above drying temperature range.

The drying pre-treatment step may be performed using a convection oven in an environment in which sufficient air is introduced.

The $Fe(NO_3)_3 \cdot 9H_2O$ undergoes the drying step to produce a material represented by Formula 1.

In Formula 1, x may be varied depending on the drying time and temperature, preferably x may be $0.5 \leq x < 1$, more preferably $0.7 \leq x < 1$. In Formula 1, the smaller the value of x, the lower the stability of the iron oxyhydroxynitrate produced. As the temperature increases in the drying step, the functional group (OH) contained in the iron oxyhydroxynitrate is thermally decomposed and converted into water ($H_2O$), the structure of the iron oxyhydroxynitrate may collapse, and when applied to a lithium secondary battery, preferably lithium-sulfur battery, it is undesirable because water ($H_2O$) is electrolyzed during the charging/discharging process of the battery and thus hydrogen gas ($H_2(g)$) can be produced.

The average particle diameter of the particles of the iron oxyhydroxynitrate prepared may be 1 to 200 μm, preferably 10 to 100 μm, more preferably 20 to 40 μm. Within this range, as the average particle diameter of the particles decreases, it is suitable for use as an additive for a positive electrode for a lithium secondary battery, preferably a lithium-sulfur battery. If the average particle diameter of the particles exceeds the above range, the particle size may be too large to be suitable as a positive electrode additive for a lithium-sulfur battery.

Step (3) is a step of preparing an aqueous phosphoric acid solution having a pH of 6 to 12, that is, preparing an aqueous phosphoric acid solution, and adjusting the pH of the aqueous phosphoric acid solution to 6 to 12.

The concentration of the aqueous phosphoric acid solution may be $1 \times 10^{-5}$ to $1 \times 10^{-1}$ M, preferably $1 \times 10^{-4}$ to $5 \times 10^{-2}$ M. If the concentration of the aqueous phosphoric acid solution is less than $1 \times 10^{-5}$ M, adsorption may not occur because the amount of hydrogen phosphate ion adsorbed on the surface is too small. If the concentration of the aqueous phosphoric acid solution exceeds $1 \times 10^{-1}$ M, an excessive amount of unnecessary hydrogen phosphate ions may exist, which may be uneconomical.

An aqueous basic solution is added to the prepared aqueous phosphoric acid solution to adjust the pH of the aqueous phosphoric acid solution to 6 to 12, preferably 8 to 10. As the pH of the aqueous phosphoric acid solution is adjusted to 6 to 12, it is possible to adsorb hydrogen phosphate ion on the surface without modification of the iron oxyhydroxynitrate of Formula 1 prepared in step (2).

For example, if the pH is acidic, less than 6, there may be a problem that the iron oxyhydroxynitrate is dissolved, when used the iron oxyhydroxynitrate with hydrogen phosphate ions adsorbed on its surface as an additive for a positive electrode for a lithium secondary battery, the pH of the slurry for a positive electrode comprising this may be lowered, and thus a problem in stability may occur.

Specifically, the hydrogen phosphate ion has a different form of $H_2PO_4^-$, $HPO_4^{2-}$, and the like depending on the pH of the aqueous phosphoric acid solution. If the pH is less than 6, the hydrogen phosphate ion is present in the form of $H_2PO_4^-$. If the pH is 6 to 12, the hydrogen phosphate ion is present in the form of $HPO_4^{2-}$. Therefore, if the hydrogen phosphate ion is adsorbed to the surface of the iron oxyhydroxynitrate at a pH of less than 6, $H_2PO_4^-$ is present on the surface of the iron oxyhydroxynitrate, and $H_2PO_4^-$ contains more hydrogen ions (Hf) than $HPO_4^{2-}$. Accordingly, if the iron oxyhydroxynitrate having $H_2PO_4^-$ adsorbed on its surface is dispersed in the aqueous solution again, the pH of the aqueous solution may be reduced.

When pH is 6 to 12, the slurry for forming a positive electrode active material layer containing a binder containing a carboxylate has a higher repulsive force as the negative charge of the carboxylate and the hydrogen phosphate ion on the surface of the iron oxyhydroxynitrate is further developed, thereby resulting in high slurry stability. However, when the pH is less than 6, the repulsive force becomes weak, and agglomeration phenomenon between the binder and the additive may occur.

Therefore, the hydrogen phosphate ion adsorbed on the surface of the iron oxyhydroxynitrate of the present invention may be $HPO_4^{2-}$.

The aqueous basic solution is not particularly limited, but may be at least one selected from the group consisting of NaOH, LiOH, $NH_4OH$, $LiH_2PO_4$, $Li_2HPO_4$, $Li_2SO_4$ and KOH, and preferably LiOH.

Step (4) is a step of mixing the iron oxyhydroxynitrate of Formula 1 obtained in step (2) with the aqueous phosphoric acid solution having a pH of 6 to 12 prepared in step (3) to prepare a mixed solution, and in step (4), a mixed solution can be prepared by specifically adding the iron oxyhydroxynitrate in the solid form to the aqueous phosphoric acid solution.

At this time, the iron oxyhydroxynitrate of Formula 1 may be comprised in an amount of 10 to 80% by weight, preferably 30 to 50% by weight based on the total weight of the mixed solution. If the iron oxyhydroxynitrate is included in an amount of less than 10% by weight, an excess of waste water is generated in the process of recovering the iron oxyhydroxynitrate with hydrogen phosphate ions adsorbed on its surface, which is inefficient. If the iron oxyhydroxynitrate is included in an amount exceeding 80% by weight, the viscosity of the mixed solution increases, and the hydrogen phosphate ion may be unevenly adsorbed on the surface.

After step (4), a step of re-adjusting the pH of the mixed solution prepared in step (4) to 6 to 12 may be further included before performing step (5).

As the iron oxyhydroxynitrate of Formula 1 is added to the aqueous phosphoric acid solution having a pH of 6 to 12 in step (4), since a change in the pH of the solution may occur, in order to maintain the pH, an aqueous basic solution is added to adjust the pH of the mixed solution back to 6 to 12. The aqueous basic solution is the same as described above in step (3).

Step (5) is a step of recovering and drying the solid material after completing the reaction of the mixed solution prepared in step (4), that is, preparing a iron oxyhydroxynitrate with hydrogen phosphate ion ($HPO_4^{2-}$) adsorbed on its surface.

In addition, preferably, the hydrogen phosphate ion is adsorbed as a monolayer on the surface of iron oxyhydroxynitrate, which means that the surface of iron oxyhydroxynitrate is modified with hydrogen phosphate ion. In addition, since the hydrogen phosphate ion was adsorbed as a single layer on the surface of the iron oxyhydroxynitrate, it can be seen that a coating layer containing hydrogen phosphate ion was formed on the surface of the iron oxyhydroxynitrate.

The reaction of the mixed solution may be to stir the mixed solution with a magnetic stirrer for 1 to 24 hours, and preferably with a magnetic stirrer for 13 to 18 hours. Hydrogen phosphate ions are adsorbed on the surface of the iron oxyhydroxynitrate of Formula 1 prepared in step (2) during the reaction time to obtain the iron oxyhydroxynitrate with hydrogen phosphate ions adsorbed on its surface.

The reaction may be performed at room temperature. If the reaction time is less than 1 hour, adsorption of the hydrogen phosphate ions on the surface of the iron oxyhydroxynitrate may not be achieved completely. If the reaction time exceeds 24 hours, it may be uneconomical because it no longer reacts.

After completion of the stirring by the magnetic stirrer, an excess of hydrogen phosphate ions can be removed to obtain an iron oxyhydroxynitrate with hydrogen phosphate ions adsorbed on its surface. The method for removing the excess hydrogen phosphate ions is not particularly limited in the present invention, but preferably centrifugation may be used.

The iron oxyhydroxynitrate with hydrogen phosphate ions adsorbed on its surface was vacuum dried at 40 to 80° C. for 8 to 24 hours, preferably at 50 to 70° C. for 10 to 15 hours to finally obtain an iron oxyhydroxynitrate with hydrogen phosphate ions adsorbed on its surface. Below the temperature and time range, a large amount of moisture may remain during drying, leading to a decrease in purity. If the temperature and time exceed the temperature and time range, agglomeration phenomenon between particles may occur, resulting in the formation of large particles or the occurrence of phase change.

Positive Electrode for Lithium Secondary Battery Comprising Iron Oxyhydroxynitrate with Hydrogen Phosphate Ions Adsorbed on its Surface In addition, the present invention is a positive electrode for a lithium secondary battery comprising a positive electrode current collector; and a positive electrode active material layer located on at least one side of the positive electrode current collector, wherein the positive electrode active material layer comprises a positive electrode active material, an electrically conductive material, a binder, and an additive, wherein the binder contains a carboxylate group, and wherein the additive includes the iron oxyhydroxynitrate of Formula 1 below with hydrogen phosphate ion ($HPO_4^{2-}$) adsorbed on its surface (described above):

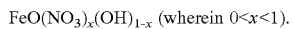

$FeO(NO_3)_x(OH)_{1-x}$ (wherein $0<x<1$). [Formula 1]

The additive is the same as for the iron oxyhydroxynitrate with hydrogen phosphate ions adsorbed on its surface, as described in the iron oxyhydroxynitrate with hydrogen phosphate ions adsorbed on its surface above. Therefore, a detailed description of the additive is omitted here.

The additive may be included in an amount of 0.1 to 40 parts by weight, preferably 1 to 15 parts by weight, and more preferably 5 to 10 parts by weight, relative to 100 parts by weight of the base solid material comprised in the active material layer for the lithium secondary battery. If the additive is less than 0.1 parts by weight, the effect of improving the reactivity of the additive to the positive electrode active material is insufficient. If the additive exceeds 40 parts by weight, the capacity of the positive electrode decreases, which is undesirable.

The base solid material comprised in the active material layer for the lithium secondary battery means a solid material comprising a positive electrode active material, a binder, and an electrically conductive material.

The binder serves to prevent detachment of the positive electrode active material layer by improving the adhesion force between the positive electrode current collector and the positive electrode active material layer. The binder may be a material that is generally soluble in a solvent and can well constitute a conductive network between the positive electrode active material and the electrically conductive material. A compound containing the carboxylate functional group is preferable as a binder because it can be attached to various substrates to increase the adhesion force between the positive electrode active material and the current collector.

The binder is not particularly limited in its kind as long as it contains a carboxylate functional group. Preferably, poly(vinyl)acetate, poly(methyl methacrylate), poly(ethyl acrylate), carboxymethyl cellulose, ethylene glycol series such as polyethylene glycol diacrylate and derivatives thereof, blends thereof, and copolymers thereof may be used, but are not limited thereto.

The binder may be comprised in an amount of about 1 to 10% by weight, preferably about 3 to 7% by weight based on the total weight of the base solid material. If the content of the binder is less than 1% by weight, the physical properties of the positive electrode are deteriorated, so that the positive electrode active material and the electrically conductive material can be detached. If the content of the binder exceeds 10% by weight, the ratio of the active material and the electrically conductive material in the positive electrode may be relatively reduced, thereby reducing battery capacity.

The positive electrode active material may be at least one selected from the group consisting of elemental sulfur ($S_8$), organic sulfur compounds, and sulfur-carbon composite, preferably sulfur-carbon composite. Therefore, the positive electrode for the lithium secondary battery of the present invention may preferably be a positive electrode for a lithium-sulfur battery. Since the sulfur material alone is not electrically conductive, it can be used in combination with an electrically conductive material. The iron oxyhydroxynitrate with hydrogen phosphate ions adsorbed on its surface according to the present invention does not affect the maintenance of the structure of the sulfur-carbon composite.

The sulfur-carbon composite may contain 60 to 80 parts by weight of sulfur, preferably 70 to 75 parts by weight of sulfur, based on 100 parts by weight of the sulfur-carbon composite. If the content of sulfur is less than 60 parts by weight, the content of the carbon material in the sulfur-carbon composite is relatively increased. As the content of the carbon is increased, the specific surface area is increased and thus when preparing the slurry, the amount of binder added should be increased. Such an increase in the additive amount of the binder may eventually increase the sheet resistance of the electrode, and may act as an insulator to prevent electron pass, thereby deteriorating the battery performance. If the content of sulfur exceeds 80 parts by weight, the sulfur or sulfur compounds not bound to the carbon material may be aggregated with each other or re-leached on the surface of the carbon material, and it may be difficult to directly participate in the electrode reaction because it is difficult to receive electrons. Therefore, the amount of sulfur contained is appropriately controlled within the above range.

The carbon in the sulfur-carbon composite may have a porous structure or a high specific surface area, and may be any of those conventionally used in the art. For example, the porous carbon material may be, but is not limited to, at least one selected from the group consisting of graphite; graphene; carbon blacks such as Denka black, acetylene black, Ketjen black, channel black, furnace black, lamp black, and thermal black; carbon nanotubes (CNTs) such as single wall carbon nanotube (SWCNT) and multiwall carbon nanotubes (MWCNT); carbon fibers such as graphite nanofiber (GNF), carbon nanofiber (CNF), and activated carbon fiber (ACF); and activated carbon, and its shape can be used without restriction as long as it is commonly used in the lithium secondary battery in the form of sphere, rod, needle, plate, tube, or bulk.

The positive electrode active material may be comprised in an amount of 50 to 95% by weight, preferably 60 to 80% by weight based on the total weight of the base solid material. If the positive electrode active material is contained in an amount of less than 50% by weight, it is difficult to sufficiently exhibit the reaction of the positive electrode. If the positive electrode active material exceeds 95% by weight, the content of the electrically conductive material and the binder is relatively insufficient, so it is difficult to sufficiently exhibit the reaction of the positive electrode.

The electrically conductive material is a material that electrically connects an electrolyte to a positive electrode active material and serves as a path through which electrons move from the current collector to the positive electrode active material, and is not particularly limited as long as it has porosity and conductivity without causing chemical changes in the battery. For example, graphite-based materials such as KS6; carbon blacks such as Super-P, carbon black, Denka black, acetylene black, Ketjen black, channel black, furnace black, lamp black, and thermal black; carbon derivatives such as fullerene; electrically conductive fibers such as carbon fiber and metal fiber; carbon fluoride, metal powders such as aluminum and nickel powder; or electrically conductive polymers such as polyaniline, polythiophene, polyacetylene, and polypyrrole are used alone or in combination.

The electrically conductive material may be contained in an amount of 1 to 10% by weight, preferably 3 to 7% by weight, relative to the total weight of the base solid material. If the electrically conductive material is contained in less than 1% by weight, the portion of the positive electrode active material that does not react increases, resulting in a decrease in the capacity of the battery. If the electrically conductive material exceeds 10% by weight, it is undesirable because it has a negative effect on high-efficiency discharging characteristics and charging/discharging cycle lifetime.

In order to form a positive electrode active material layer in the positive electrode for the lithium secondary battery, the base solid material comprising the positive electrode active material, the electrically conductive material, and the binder and the additive must be prepared in a slurry state. In order to prepare in the slurry state, an additional solvent is included, and it is most preferred that the solvent is easily dried and can dissolve the binder well, but keep the positive electrode active material, the electrically conductive material, and non-reactive particulates in a dispersed state without dissolving them.

The solvent according to the present invention may be water or an organic solvent. The organic solvent may be an organic solvent comprising at least one selected from the group consisting of dimethylformamide, isopropyl alcohol, acetonitrile, methanol, ethanol, and tetrahydrofuran.

The mixing of the positive electrode active material, the binder, the electrically conductive material, the iron oxyhydroxynitrate of Formula 1 with hydrogen phosphate ions adsorbed on its surface, and the solvent can be carried out by a conventional method using a conventional mixer such as a paste mixer, a high-speed shear mixer, or a homo-mixer.

In addition, the positive electrode active material layer of the present invention may additionally comprise, if necessary, additives commonly used for the purpose of improving its function in the related art, in addition to the iron oxyhydroxynitrate with hydrogen phosphate ions adsorbed on its surface. For example, viscosity modifiers, fluidizing agents, fillers, and the like may be additionally comprised.

The positive electrode can be manufactured by a method known in the art. For example, the positive electrode can be prepared by applying the slurry on the positive electrode current collector and rolling to produce a positive electrode for a lithium secondary battery, and may be prepared by coating the current collector with an appropriate thickness depending on the thickness of the positive electrode to be formed.

There are no limitations on the method of coating the slurry on the current collector. For example, it is possible to use a coating method such as doctor blade coating, dip coating, gravure coating, slit die coating, spin coating, comma coating, bar coating, reverse roll coating, screen coating, cap coating and the like.

The positive electrode current collector generally can be made in a thickness of 3 to 500 μm and is not particularly limited as long as it has high electrical conductivity while supporting the positive electrode active material without causing chemical changes in the battery. For example, an electrically conductive metal such as stainless steel, aluminum, copper, or titanium, etc., can be used as the positive electrode current collector, and preferably an aluminum current collector can be used. The positive electrode current collector may be formed in various forms such as film, sheet, foil, net, porous body, foam, or nonwoven fabric.

Lithium Secondary Battery

In addition, the present invention relates to a lithium secondary battery comprising a positive electrode, a negative electrode, a separator interposed between the positive electrode and the negative electrode, and an electrolyte solution.

The positive electrode may be the positive electrode for the lithium secondary battery of the present invention described above, and the lithium secondary battery may be a lithium-sulfur battery.

The negative electrode may be composed of a current collector and a negative electrode active material layer formed on one or both surfaces thereof. In addition, the negative electrode may be a lithium metal plate.

The current collector is for supporting the negative electrode active material and is not particularly limited as long as it is electrochemically stable in the voltage range of the lithium secondary battery while having excellent conductivity, and for example, copper, stainless steel, aluminum, nickel, titanium, palladium, sintered carbon, or copper or stainless steel whose surface is treated with carbon, nickel, silver or the like, or aluminum-cadmium alloy or the like may be used.

The negative electrode current collector can enhance the bonding force with the negative electrode active material by having fine irregularities on its surface, and may be formed in various forms such as film, sheet, foil, mesh, net, porous body, foam, or nonwoven fabric.

The negative electrode active material may comprise a material capable of reversibly intercalating or deintercalating lithium ion, a material capable of reacting with lithium ion to reversibly form lithium containing compounds, or lithium metal or lithium alloy.

The material capable of reversibly intercalating or deintercalating lithium ion can be, for example, crystalline carbon, amorphous carbon, or a mixture thereof.

The material capable of reacting with lithium ion to reversibly form lithium containing compounds may be, for example, tin oxide, titanium nitrate, or silicon.

The lithium alloy may be, for example, an alloy of lithium (Li) and a metal selected from the group consisting of sodium (Na), potassium (K), rubidium (Rb), cesium (Cs), francium (Fr), beryllium (Be), magnesium (Mg), calcium (Ca), strontium (Sr), barium (Ba), radium (Ra), aluminum (Al), and tin (Sn).

A separator is additionally comprised between the positive electrode and the negative electrode. The separator enables the transport of lithium ions between the positive electrode and the negative electrode while separating or insulating the positive electrode and the negative electrode from each other. The separator may be made of a porous, nonconductive or insulating material. The separator may be an independent member such as a film or a coating layer added to the positive electrode and/or the negative electrode.

The material constituting the separator comprises, for example, but is not limited to, polyolefins such as polyethylene and polypropylene, glass fiber filter paper, and ceramic materials, and the thickness thereof may be about 5 to about 50 μm, preferably about 5 to about 25 μm.

The electrolyte solution is composed of a lithium salt and an electrolyte solution as a non-aqueous electrolyte containing a lithium salt. As the electrolyte solution, non-aqueous organic solvents, organic solid electrolytes, and inorganic solid electrolytes may be used.

The lithium salt may be used without limitation as long as it is commonly used in the electrolyte solution for lithium-sulfur batteries. For example, at least one selected from the group consisting of LiSCN, LiBr, LiI, $LiPF_6$, $LiBF_4$, $LiB_{10}Cl_{10}$, $LiSO_3CF_3$, LiCl, $LiClO_4$, $LiSO_3CH_3$, $LiB(Ph)_4$, $LiC(SO_2CF_3)_3$, $LiN(SO_2CF_3)_2$, $LiCF_3CO_2$, $LiAsF_6$, $LiSbF_6$, $LiAlCl_4$, LiFSI, lithium chloroborane, lithium lower aliphatic carboxylate and the like may be used.

In addition, the concentration of the lithium salt in the electrolyte solution may be 0.2 to 2 M, preferably 0.6 to 2 M, more preferably, 0.7 to 1.7 M. If the concentration of the lithium salt is less than 0.2 M, the conductivity of the electrolyte solution may be lowered and thus the performance of the electrolyte solution may be deteriorated. If the concentration of the lithium salt exceeds 2 M, the viscosity of the electrolyte solution may increase and thus the mobility of the lithium ion may be reduced.

The non-aqueous organic solvent should dissolve the lithium salt well, and the non-aqueous organic solvent of the present invention may comprise, for example, aprotic organic solvents such as N-methyl-2-pyrrolidinone, propylene carbonate, ethylene carbonate, butylene carbonate, dimethyl carbonate, diethyl carbonate, ethyl methyl carbonate, gamma-butyrolactone, 1,2-dimethoxyethane, 1,2-diethoxyethane, tetrahydrofuran, 2-methyl tetrahydrofuran, dimethylsulfoxide, 1,3-dioxolane, 4-methyl-1,3-dioxen, diethylether, formamide, dimethylformamide, dioxolane, acetonitrile, nitromethane, methyl formate, methyl acetate, triester phosphate, trimethoxymethane, dioxolane derivatives, sulfolane, methyl sulfolane, 1,3-dimethyl-2-imidazolidinone, propylene carbonate derivatives, tetrahydrofuran derivatives, ether, methyl propionate, and ethyl propionate, and these organic solvents can be used alone or in a mixed solvent form of two or more solvents thereof.

As the organic solid electrolyte, for example, polyethylene derivatives, polyethylene oxide derivatives, polypropylene oxide derivatives, phosphate ester polymers, polyalginate lysine, polyester sulfide, polyvinyl alcohol, polyvinylidene fluoride, and polymers comprising ionic dissociation groups and the like can be used.

As the inorganic solid electrolyte, for example, nitrides, halides, sulfates and the like of Li such as $Li_3N$, LiI, $Li_5NI_2$, $Li_3N$—LiI—LiOH, $LiSiO_4$, $LiSiO_4$-LiT-LiOH, $Li_2SiS_3$, $Li_4SiO_4$, $Li_4SiO_4$—LiI—LiOH, $Li_3PO_4$—$Li_2S$—$SiS_2$ may be used.

To the electrolyte of the present invention, for example, pyridine, triethylphosphite, triethanolamine, cyclic ether, ethylene diamine, n-glyme, hexamethylphosphoric triamide, nitrobenzene derivatives, sulfur, quinone imine dyes, N-substituted oxazolidinone, N,N-substituted imidazolidine, ethylene glycol dialkyl ether, ammonium salt, pyrrole, 2-methoxy ethanol, or aluminum trichloride, etc. may also be added for the purpose of improving charging/discharging characteristics, flame retardancy, and the like. In some cases, a halogen-containing solvent such as carbon tetrachloride, ethylene trifluoride or the like can be also added for the purpose of imparting nonflammability, and carbon dioxide gas can be further comprised for the purpose of improving storage characteristics at a high temperature, and FEC (fluoro-ethylene carbonate), PRS (propene sultone), FPC (fluoro-propylene carbonate) and the like can be further comprised.

The electrolyte may be used as a liquid electrolyte or also as an electrolyte separator form in a solid state. When used as a liquid electrolyte, a separator made of porous glass, plastic, ceramic, or polymer is further comprised as a physical separator having a function of physically separating the electrode.

The lithium secondary battery may be classified into a cylindrical shape, a square shape, a coin shape, and a pouch shape depending on the shape, and may be divided into a bulk type and a thin film type depending on size. The structure and manufacturing method of these batteries are well known in the art, so detailed descriptions thereof are omitted.

The lithium secondary battery of the present invention comprised the iron oxyhydroxynitrate with hydrogen phosphate ions adsorbed on its surface as an additive of a positive electrode, but does not affect the initial discharging capacity and lifetime characteristics of the battery. Therefore, it is possible to improve the adhesion force between the current collector and the positive electrode active material layer while maintaining the initial discharging capacity and lifetime characteristics of the battery.

Hereinafter, the present invention will be described in detail with reference to examples to specifically describe the present invention. However, the examples according to the present invention can be modified in many different forms, and the scope of the present invention should not be interpreted as being limited to the examples described below. The examples of the present invention are provided to more fully describe the present invention to those skilled in the art.

Preparation Example 1

Preparation of Iron Oxyhydroxynitrate with Hydrogen Phosphate Ions Adsorbed on Its Surface A 1.8 M solution was prepared by dissolving 75 g of $Fe(NO_3)_3 \cdot 9H_2O$ (Sigma-Aldrich company) in a mixed solvent of 50 g of DIW (deionized water) and 50 g of ethanol. The prepared solution was placed in a glass bath, air was sufficiently injected in a convection oven, and dried at 80° C. for 24 hours to obtain an iron oxyhydroxynitrate of formula $FeO(NO_3)_x(OH)_{1-x}$ (wherein $0.5 \leq x < 1$).

568 µL of an aqueous 85% by weight phosphoric acid ($H_3PO_4$) solution was mixed with 250 mL of distilled water to prepare an aqueous phosphoric acid solution having a concentration of $3.3 \times 10^{-2}$ M.

The pH of the aqueous phosphoric acid solution was adjusted to 9.7 by adding a 1.25 M aqueous lithium hydroxide (LiOH) solution to the aqueous phosphoric acid solution.

1 g of iron oxyhydroxynitrate was added to the aqueous phosphoric acid solution having a pH of 9.7 to prepare a mixed solution, and the pH of the mixed solution was adjusted to 9.7 by adding a 1.25 M aqueous lithium hydroxide solution.

The mixed solution having a pH of 9.7 was magnetically stirred for 16 hours to adsorb hydrogen phosphate ions on the surface of the iron oxyhydroxynitrate.

After that, the excess hydrogen phosphate ion remaining unreacted is removed by centrifugation, and a solid material was recovered. The recovered solid material was vacuum dried at 60° C. for 12 hours to prepare an iron oxyhydroxynitrate with hydrogen phosphate ions ($HPO_4^{2-}$) adsorbed on its surface as a monolayer.

The average particle diameter of the iron oxyhydroxynitrate was 25 µm.

A SEM-EDS analysis was performed to confirm that hydrogen phosphate ions ($HPO_4^{2-}$) were adsorbed on the surface of the iron oxyhydroxynitrate, and as a result, it was confirmed that phosphorus elements were distributed on the surface of the iron oxyhydroxynitrate particles. Therefore, it can be seen that hydrogen phosphate ions are adsorbed on the surface of the iron oxyhydroxynitrate (FIG. 1).

Preparation Example 2

Preparation of Iron Oxyhydroxynitrate with Hydrogen Phosphate Ions Adsorbed on its Surface An iron oxyhydroxynitrate with hydrogen phosphate ions ($HPO_4^{2-}$) adsorbed on its surface was prepared in the same manner as in Preparation Example 1, and the average particle diameter of the iron oxyhydroxynitrate was 25 µm, except that an $8.2 \times 10^{-3}$ M aqueous phosphoric acid solution is used instead of the $3.3 \times 10^{-2}$ M aqueous phosphoric acid solution used in Preparation Example 1.

Preparation Example 3

Preparation of Iron Oxyhydroxynitrate with Hydrogen Phosphate Ions Adsorbed on its Surface An iron oxyhydroxynitrate with hydrogen phosphate ions ($HPO_4^{2-}$) adsorbed on its surface was prepared in the same manner as in Preparation Example 1, and the average particle diameter of the iron oxyhydroxynitrate was 25 µm, except that an $6.2 \times 10^{-3}$ M aqueous phosphoric acid solution is used instead of the $3.3 \times 10^{-2}$ M aqueous phosphoric acid solution used in Preparation Example 1.

Preparation Example 4

Preparation of Iron Oxyhydroxynitrate with Hydrogen Phosphate Ions Adsorbed on its Surface An iron oxyhydroxynitrate with hydrogen phosphate ions ($HPO_4^{2-}$) adsorbed on its surface was prepared in the same manner as in Preparation Example 1, and the average particle diameter of the iron oxyhydroxynitrate was 25 µm, except that an $4.1 \times 10^{-3}$ M aqueous phosphoric acid solution is used instead of the $3.3 \times 10^{-2}$ M aqueous phosphoric acid solution used in Preparation Example 1.

Preparation Example 5

Preparation of Iron Oxyhydroxynitrate with Hydrogen Phosphate Ions Adsorbed on Its Surface An iron oxyhydroxynitrate with hydrogen phosphate ions ($HPO_4^{2-}$) adsorbed on its surface was prepared in the same manner as in Preparation Example 1, and the average particle diameter of the iron oxyhydroxynitrate was 25 µm, except that an $1.2 \times 10^{-3}$ M aqueous phosphoric acid solution is used instead of the $3.3 \times 10^{-2}$ M aqueous phosphoric acid solution used in Preparation Example 1.

Preparation Example 6

Preparation of Iron Oxyhydroxynitrate with Hydrogen Phosphate Ions Adsorbed on its Surface An iron oxyhydroxynitrate with hydrogen phosphate ions ($HPO_4^{2-}$) adsorbed on its surface was prepared in the same manner as in Preparation Example 1, and the average particle diameter of the iron oxyhydroxynitrate was 25 µm, except that an $8.2 \times 10^{-4}$ M aqueous phosphoric acid solution is used instead of the $3.3 \times 10^{-2}$ M aqueous phosphoric acid solution used in Preparation Example 1.

Preparation Example 7

Preparation of Iron Oxyhydroxynitrate with Hydrogen Phosphate Ions Adsorbed on its Surface An iron oxyhydroxynitrate with hydrogen phosphate ions ($HPO_4^{2-}$) adsorbed on its surface was prepared in the same manner as in Preparation Example 1, and the average particle diameter of the iron oxyhydroxynitrate was 25 µm, except that an 4.1×10⁻⁴ M aqueous phosphoric acid solution is used instead of the 3.3×10⁻² M aqueous phosphoric acid solution used in Preparation Example 1.

Comparative Preparation Example 1

Preparation of Iron Oxyhydroxynitrate

A 1.8 M solution was prepared by dissolving 75 g of Fe(NO$_3$)$_3$·9H$_2$O (Sigma-Aldrich company) in a mixed solvent of 50 g of DIW (deionized water) and 50 g of ethanol. The prepared solution was placed in a glass bath, air was sufficiently injected in a convection oven, and dried at 80° C. for 24 hours to obtain an iron oxyhydroxynitrate of formula FeO(NO$_3$)$_x$(OH)$_{1-x}$ (wherein 0.5≤x<1). The average particle diameter of the iron oxyhydroxynitrate was 25 μm.

Comparative Preparation Example 2

Preparation of Iron Oxide with Hydrogen Phosphate Ions Adsorbed on its Surface

An aqueous phosphoric acid solution having a concentration of 8.2×10⁻⁴ M was prepared by mixing a 85% by weight aqueous phosphoric acid (H$_3$PO$_4$) solution with distilled water.

The pH of the aqueous phosphoric acid solution was adjusted to 9.7 by adding a 1.25 M aqueous lithium hydroxide (LiOH) solution to the aqueous phosphoric acid solution.

1 g of iron oxide was added to the aqueous phosphoric acid solution having a pH of 9.7 to prepare a mixed solution, and the pH of the mixed solution was adjusted to 9.7 again by adding a 1.25 M aqueous lithium hydroxide solution.

The mixed solution having a pH of 9.7 was magnetically stirred for 16 hours to adsorb hydrogen phosphate ions on the surface of iron oxide.

After that, the excess hydrogen phosphate ions remaining unreacted is removed by centrifugation, and a solid material was recovered. The recovered solid material was vacuum dried at 60° C. for 12 hours to prepare an iron oxide (Fe$_3$O$_4$) with hydrogen phosphate ions (HPO$_4^{2-}$) adsorbed on its surface as a monolayer.

Comparative Preparation Example 3

Preparation of Iron Oxyhydroxynitrate with Hydrogen Phosphate Ions Adsorbed on its Surface An iron oxyhydroxynitrate with hydrogen phosphate ions adsorbed on its surface was prepared in the same manner as in Preparation Example 1, and the hydrogen phosphate ion was H$_2$PO$_4^-$, except that the pH of the aqueous phosphoric acid solution and the mixed solution is adjusted to 4.7. The average particle diameter of the iron oxyhydroxynitrate was 25 μm.

Experimental Example 1

Measurement of the Adsorption of Hydrogen Phosphate Ion on the Surface of Iron Oxyhydroxynitrate Whether or not hydrogen phosphate ions were adsorbed on the surface of the iron oxyhydroxynitrates prepared in Preparation Examples 1 to 7 and Comparative Preparation Example 1 was confirmed using FT-IR (Agilent company, Cary-630).

As a result of FT-IR, in the case of Preparation Examples 1 to 7, broad bands in the range of 900 to 1150 cm⁻¹ which were not observed in Comparative Preparation Example 1 were observed (FIG. 2). It was confirmed that since the band of the region was caused by hydrogen phosphate ions, hydrogen phosphate ions were adsorbed on the surface of iron oxyhydroxynitrate in the case of Preparation Examples 1 to 7.

In addition, the surface charge of iron oxyhydroxynitrate prepared in Preparation Example 1 and Comparative Preparation Example 1 was measured using Zeta potential (Malvern Panalytical company, Zetasizer Nano ZS90). For the measurement, a sample in an aqueous solution state was used and the pH of the aqueous solution was adjusted to 7 using an aqueous phosphoric acid solution or an aqueous lithium hydroxide solution. Zeta potential measurement was repeated three times, and the results are shown in Table 1 and FIG. 3.

TABLE 1

|  | Preparation Example 1 | Comparative Preparation Example 1 |
| --- | --- | --- |
| First measurement | −16.2 mV | 3.14 mV |
| Second measurement | −18.1 mV | 5.19 mV |
| Third measurement | −17.9 mV | 4.35 mV |
| Mean | −17.4 mV | 4.2 mV |

From the above results, it was confirmed that Preparation Example 1 had a surface negative charge, whereas Comparative Preparation Example 1 had a surface positive charge.

That is, it was confirmed that in the case of Preparation Example 1, a coating layer made of hydrogen phosphate ions was formed on the surface of iron oxyhydroxynitrate, while in the case of Comparative Preparation Example 1, the coating layer was not formed. Preparation Example 1 can be expected to be due to the fact that the hydrogen phosphate ions adsorbed on the surface changed the isoelectric point of iron oxyhydroxynitrate.

Experimental Example 2

Observation of the Degree of Agglomeration with the Binder

After mixing 7.6% by weight of Li-AG of Formula 2 (Sumitomo Seika Chemicals Company, Ltd., Japan), binder solution (2.63 g, solid material 0.2 g), 0.2 g of additive and 5 g of water (DIW), the reaction was performed for 10 minutes with an 80 g of acoustic mix to prepare a solution in which the binder and the additive were mixed, and the degree of agglomeration of the additive and the binder was observed using a particle size analyzer (Microtrac company, S3500).

[Formula 2]

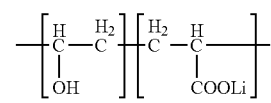

At this time, each mixed solution was prepared by using the iron oxyhydroxynitrate with hydrogen phosphate ions adsorbed on its surface of Preparation Example 1, the iron oxyhydroxynitrate of Comparative Preparation Example 1, and the iron oxyhydroxynitrate with hydrogen phosphate ion ($H_2PO_4^-$) adsorbed on its surface of Comparative Preparation Example 3, respectively.

In the results of FIG. 4, in the case of Comparative Preparation Example 3, two peaks were observed. This means that due to the low pH (4.7), hydrogen phosphate ions are adsorbed to iron oxyhydroxynitrate in the form of $H_2PO_4^-$, resulting in changes in iron oxyhydroxynitrate, and it can be seen that the agglomeration phenomenon with the binder was intensified due to the weak repelling force with carboxylate.

On the other hand, similar peaks were observed in Preparation Example 1 and Comparative Preparation Example 1. These were observed in more detail through a change in particle size over time.

FIGS. 5 to 7 are the results of measuring the change in particle size over time in Preparation Example 1 and Comparative Preparation Example 1, which show that even after time, the iron oxyhydroxynitrate with hydrogen phosphate ions adsorbed on its surface of Preparation Example 1 showed small particle size at all particle size indices ($D_{50}$, $D_{90}$, average (MV)), as compared to iron oxyhydroxynitrate that does not contain hydrogen phosphate ions on the surface of Comparative Preparation Example 1. From this, it was confirmed that Preparation Example 1 significantly reduced the agglomeration phenomenon with the binder compared to Comparative Preparation Example 1.

That is, it can be seen that when the iron oxyhydroxynitrate with hydrogen phosphate ions ($HPO_4^{2-}$) adsorbed on its surface is used together with a binder containing a carboxylate functional group, as the hydrogen phosphate ion ($HPO_4^{2-}$) and carboxylate repel each other, the agglomeration phenomenon with the binder can be solved.

Experimental Example 3

CV Measurement of Iron Oxyhydroxynitrate

Cyclic voltammetry (CV) analysis was performed to confirm whether electrical activity for the iron oxyhydroxynitrate of Preparation Example 1 and Comparative Preparation Example 1 existed.

Specifically, a catalyst electrode comprising the iron oxyhydroxynitrate with hydrogen phosphate ions adsorbed on its surface in Preparation Example 1, an electrically conductive material (carbon nanotube) and a binder (PAA) in a weight ratio of 6:2:2 was prepared. The loading amount of the catalyst of the electrode was about 1 mg/cm$^2$. A coin cell having a structure comprising the catalyst electrode, an electrolyte solution, and a Li electrode was manufactured, and charging/discharging was performed for 5 cycles.

After completing the cycle in the charged state, the coin cell was disassembled to recover the catalyst electrode, and a cell having a symmetrical structure comprising the catalyst electrode, an electrolyte solution, and the catalyst electrode was prepared using the recovered catalyst electrode. At this time, an electrolyte solution containing 0.53 M of $Li_2S_6$ was used as the electrolyte solution used in the cell of the symmetrical structure. After wetting for 1 day, CV was measured under the conditions of scan rate=3 mV/S, voltage window=−1V to +1V.

In addition, CV was measured in the same manner as above by using the iron oxyhydroxynitrate of Comparative Preparation Example 1 instead of Preparation Example 1.

The results are shown in FIG. 8, and it was confirmed that Preparation Example 1 shows a higher current density than Comparative Preparation Example 1. This means that Preparation Example 1 can react with the polysulfide ($Li_2S_6$) contained in the electrolyte solution at a faster rate than Comparative Preparation Example 1, and is a result showing that Preparation Example 1 has a very good catalytic activity compared to Comparative Preparation Example 1.

<Manufacture of Positive Electrode for Lithium-Sulfur Battery>

Example 1

First, based on the total weight (100 parts by weight) to the base solid material (an active material, an electrically conductive material and a binder) to which the iron oxyhydroxynitrate containing a coating layer containing hydrogen phosphate ions on its surface prepared in Preparation Example 1, 10 parts by weight of the iron oxyhydroxynitrate containing a coating layer containing hydrogen phosphate ions on its surface prepared in Preparation Example 1 was added into water as a solvent and dissolved.

Thereafter, based on the obtained solution, 100 parts by weight of base solid material, that is, 84 parts by weight of sulfur-carbon composite (S/C 75:25 parts by weight) as an active material, 5 parts by weight of GCNT as an electrically conductive material, 2.5 parts by weight of Lithiated carboxymethylcellulose (LiCMC) as a binder and 3.5 parts by weight of styrene-butadiene (SBR) were added and mixed to prepare a slurry composition for a positive electrode.

Subsequently, the prepared slurry composition was coated on a current collector (Al foil), dried at 50° C. for 12 hours, and pressed with a roll press device to manufacture a positive electrode for a lithium-sulfur battery. At this time, the loading amount was 5.5 mAh/cm$^2$, and the porosity of the electrode was 70%.

Example 2

A positive electrode for the lithium-sulfur battery of Example 2 was manufactured in the same manner as in Example 1, except that the iron oxyhydroxynitrate with hydrogen phosphate ion ($HPO_4^{2-}$) adsorbed on its surface prepared in Preparation Example 2 is used instead of the iron oxyhydroxynitrate adsorbed with hydrogen phosphate ion ($HPO_4^{2-}$) on its surface prepared in Preparation Example 1 above.

Example 3

A positive electrode for the lithium-sulfur battery of Example 3 was manufactured in the same manner as in Example 1, except that the iron oxyhydroxynitrate with hydrogen phosphate ion ($HPO_4^{2-}$) adsorbed on its surface prepared in Preparation Example 3 is used instead of the iron oxyhydroxynitrate adsorbed with hydrogen phosphate ion ($HPO_4^{2-}$) on its surface prepared in Preparation Example 1 above.

Example 4

A positive electrode for the lithium-sulfur battery of Example 4 was manufactured in the same manner as in Example 1, except that the iron oxyhydroxynitrate with hydrogen phosphate ion ($HPO_4^{2-}$) adsorbed on its surface prepared in Preparation Example 4 is used instead of the iron oxyhydroxynitrate adsorbed with hydrogen phosphate ion ($HPO_4^{2-}$) on its surface prepared in Preparation Example 1 above.

Example 5

A positive electrode for the lithium-sulfur battery of Example 5 was manufactured in the same manner as in Example 1, except that the iron oxyhydroxynitrate with hydrogen phosphate ion ($HPO_4^{2-}$) adsorbed on its surface prepared in Preparation Example 5 is used instead of the iron oxyhydroxynitrate adsorbed with hydrogen phosphate ion ($HPO_4^{2-}$) on its surface prepared in Preparation Example 1 above.

Example 6

A positive electrode for the lithium-sulfur battery of Example 6 was manufactured in the same manner as in Example 1, except that the iron oxyhydroxynitrate with hydrogen phosphate ion ($HPO_4^{2-}$) adsorbed on its surface prepared in Preparation Example 6 is used instead of the iron oxyhydroxynitrate adsorbed with hydrogen phosphate ion ($HPO_4^{2-}$) on its surface prepared in Preparation Example 1 above.

Example 7

A positive electrode for the lithium-sulfur battery of Example 7 was manufactured in the same manner as in Example 1, except that the iron oxyhydroxynitrate with hydrogen phosphate ion ($HPO_4^{2-}$) adsorbed on its surface prepared in Preparation Example 7 is used instead of the iron oxyhydroxynitrate adsorbed with hydrogen phosphate ion ($HPO_4^{2-}$) on its surface prepared in Preparation Example 1 above.

Example 8

First, based on the total weight (100 parts by weight) to the base solid material (an active material, an electrically conductive material and a binder) to which the iron oxyhydroxynitrate containing a coating layer containing hydrogen phosphate ions on its surface prepared in Preparation Example 6, 5 parts by weight of the iron oxyhydroxynitrate containing a coating layer containing hydrogen phosphate ions on its surface prepared in Preparation Example 6 was added into water as a solvent and dissolved.

Thereafter, based on the obtained solution, 100 parts by weight of base solid material, that is, 91 parts by weight of sulfur-carbon composite (S/C 75:25 parts by weight) as an active material, 1.5 parts by weight of Lithiated carboxymethylcellulose (LiCMC) as a binder and 2.5 parts by weight of styrene-butadiene (SBR) were added and mixed to prepare a slurry composition for a positive electrode.

Subsequently, the prepared slurry composition was coated on a current collector (Al foil), dried at 50° C. for 12 hours, and pressed with a roll press device to manufacture a positive electrode for a lithium-sulfur battery. At this time, the loading amount was 3.5 mAh/cm², and the porosity of the electrode was 70%.

Comparative Example 1

A positive electrode for lithium-sulfur battery of Comparative Example 1 was manufacture in the same manner as in Example 1, except that the iron oxyhydroxynitrate prepared in Comparative Preparation Example 1 is used instead of the iron oxyhydroxynitrate with hydrogen phosphate ions ($HPO_4^{2-}$) adsorbed on its surface prepared in Preparation Example 1 above.

Comparative Example 2

A positive electrode for lithium-sulfur battery of Comparative Example 2 was manufacture in the same manner as in Example 8, except that the iron oxide with hydrogen phosphate ions ($HPO_4^{2-}$) adsorbed on its surface prepared in Comparative Preparation Example 2 is used instead of the iron oxyhydroxynitrate with hydrogen phosphate ions ($HPO_4^{2-}$) adsorbed on its surface prepared in Preparation Example 6 above.

Experimental Example 4

Measurement of Adhesion Force of Positive Electrode for Lithium-Sulfur Battery The adhesion force of the positive electrode for the lithium-sulfur batteries prepared in Examples 1 to 7 and Comparative Example 1 was measured. The adhesion force was measured by pulling the electrode in a 90-degree direction using a Peel test device, and measuring the force when the positive electrode active material layer was detached to measure the adhesion force of the positive electrode, and the results are shown in Table 2 below. The adhesion force means the adhesion force of the positive electrode active material layer to the positive electrode current collector.

TABLE 2

|  | Adhesion force (gf/cm) |
| --- | --- |
| Example 1 | 24.3 |
| Example 2 | 21 |
| Example 3 | 21.7 |
| Example 4 | 16.9 |
| Example 5 | 17.1 |
| Example 6 | 14.4 |
| Example 7 | 11.5 |
| Comparative Example 1 | 1.5 |

Examples 1 to 7 comprise the iron oxyhydroxynitrate with hydrogen phosphate ions ($HPO_4^{2-}$) adsorbed on its surface as an additive, and Comparative Example 1 comprises the iron oxyhydroxynitrate with no hydrogen phosphate ions adsorbed on its surface.

In the results of Table 2, Examples 1 to 7 showed about 10 times more adhesion force than Comparative Example 1, and that the higher the concentration of hydrogen phosphate ions, the stronger the adhesion force.

From the above results, it was found that the hydrogen phosphate ions adsorbed on the surface repel each other with the carboxylate of the binder to weaken the interaction, thereby improving the adhesive function of the binder. On the other hand, it was found that when hydrogen phosphate ions are not adsorbed on the surface, the surface of iron oxyhydroxynitrate and the carboxylate of the binder interact, thereby deteriorating the adhesive function of the binder.

Experimental Example 5

Evaluation of Charging/Discharging Characteristics of Lithium-Sulfur Battery (1)

A polyethylene separator was punched to 19 phi, a 45 μm lithium metal as a negative electrode was punched to 16 phi, the ones prepared in Examples 1 to 7 and Comparative Example 1 as a positive electrode were punched to 14 phi, respectively, and lithium-sulfur batteries of each coin cell of Examples 1 to 7 and Comparative Example 1 were manufactured by using an organic solvent, in which lithium salt was dissolved, as an electrolyte solution.

The lithium-sulfur batteries of the manufactured coin cell were measured for discharging capacity from 1.8 V to 2.5 V using a charging/discharging measuring device (PESC05-0.01, PNE solution, Korea). After charging/discharging 3 cycles at a current density of 0.1C, and then charging/discharging 3 cycles at 0.3C, charging/discharging cycles were performed according to the experimental method of 0.3C charging/0.5C discharging, and the results are shown in Table 3 and FIG. 9 below.

TABLE 3

|  | 0.1 C discharging 1st cycle (mAh/g) | 0.1 C discharging 3rd cycle (mAh/g) | 0.5 C discharging (mAh/g) |
|---|---|---|---|
| Example 1 | 1121 ± 13 | 916 ± 35 | 768 ± 31 |
| Example 2 | 1152 ± 11 | 981 ± 19 | 814 ± 40 |
| Example 3 | 1163 ± 12 | 993 ± 27 | 827 ± 38 |
| Example 4 | 1153 ± 14 | 996 ± 28 | 812 ± 43 |
| Example 5 | 1160 ± 15 | 1001 ± 33 | 824 ± 44 |
| Example 6 | 1166 ± 25 | 1006 ± 29 | 836 ± 29 |
| Example 7 | 1154 ± 9 | 985 ± 22 | 812 ± 11 |
| Comparative Example 1 | 1170 ± 6 | 954 ± 19 | 794 ± 16 |

Example 1 shows the initial 0.1C discharging capacity of 1121 mAh/g, Examples 2 to 7 show the initial 0.1C discharging capacity of 1152 to 1166 mAh/g, and Comparative Example 1 shows the initial 0.1C discharging capacity of 1170 mAh/g, and accordingly, Comparative Example 1 has a high discharging capacity. However, the discharging capacity of the third cycle of 0.1C was 954 mAh/g for Comparative Example 1, and 981 to 1006 mAh/g for Examples 2 to 7, indicating higher discharging capacity. In addition, even at 0.5C discharging capacity, Examples 2 to 7 showed higher discharging capacity than Comparative Example 1. Example 1 is expected to have a lower discharging capacity than Examples 2 to 7 while using a higher concentration of aqueous phosphoric acid solution than Examples 2 to 7.

From the above results, it was found that when hydrogen phosphate ions are adsorbed to the surface of iron oxyhydroxynitrate in an appropriate amount, the capacity of the positive electrode active material is improved compared to the iron oxyhydroxynitrate where hydrogen phosphate ions are not adsorbed on the surface.

Therefore, it was confirmed that the iron oxyhydroxynitrate with hydrogen phosphate ions adsorbed on its surface improves the initial discharging capacity of the cell, while improving the adhesion force of the positive electrode active material layer to the current collector.

Experimental Example 6

Evaluation of Charging/Discharging Characteristics of Lithium-Sulfur Battery (2)

A polyethylene separator was punched to 19 phi, a 45 μm lithium metal as a negative electrode was punched to 16 phi, the ones prepared in Example 8 and Comparative Example 2 as a positive electrode were punched to 14 phi, respectively, and lithium-sulfur batteries of each coin cell of Example 8 to 7 and Comparative Example 2 were manufactured by using an organic solvent, in which lithium salt was dissolved, as an electrolyte solution.

The lithium-sulfur batteries of the manufactured coin cell were measured for discharging capacity from 1.8 V to 2.5 V using a charging/discharging measuring device (PESC05-0.01, PNE solution, Korea). After charging/discharging 3 cycles at a current density of 0.1C, and then charging/discharging 3 cycles at 0.3C, charging/discharging cycles were performed according to the experimental method of 0.3C charging/0.5C discharging, and the results are shown in Table 4 and FIGS. 10 and 11 below.

TABLE 4

|  | 0.1 C discharging 1st cycle (mAh/g) | 0.1 C discharging 3rd cycle (mAh/g) | 0.5 C discharging (mAh/g) |
|---|---|---|---|
| Example 8 | 1150 ± 11 | 888 ± 24 | 747 ± 29 |
| Comparative Example 2 | 1082 ± 4 | 872 ± 11 | 730 ± 11 |

As a result of the performance test of the coin cells of Example 8 and Comparative Example 2, as shown in FIGS. 10 and 11, it was confirmed that the iron oxyhydroxynitrate adsorbed with hydrogen phosphate ions is superior in both 0.1C 1st discharging capacity, and 3rd discharging capacity and 0.5C discharging capacity compared to iron oxide adsorbed with hydrogen phosphate ions.

The invention claimed is:

1. A modified iron oxyhydroxynitrate comprising:
   an iron oxyhydroxynitrate of the following Formula 1:

$FeO(NO_3)_x(OH)_{1-x}$ wherein $0<x<1$; and [Formula 1]

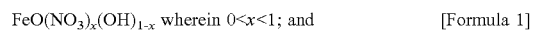

hydrogen phosphate ions ($HPO_4^{2-}$) adsorbed on a surface of the iron oxyhydroxynitrate,
   wherein the iron oxyhydroxynitrate of Formula 1 is present as particles having an average particle diameter of 1 μm to 200 μm.

2. The modified iron oxyhydroxynitrate according to claim 1, wherein the hydrogen phosphate ions are adsorbed as a monolayer on the surface of the iron oxyhydroxynitrate.

3. The modified iron oxyhydroxynitrate according to claim 1, wherein the modified iron oxyhydroxynitrate is suitable as an additive for a positive electrode for a lithium secondary battery.

4. A method for preparing the modified iron oxyhydroxynitrate according to claim 1, comprising the steps of:
   (1) preparing a $Fe(NO_3)_3 \cdot 9H_2O$ solution by dissolving $Fe(NO_3)_3 \cdot 9H_2O$ in a mixed solvent comprising an aqueous solvent and an organic solvent;
   (2) drying the $Fe(NO_3)_3 \cdot 9H_2O$ solution to obtain iron oxyhydroxynitrate of the following Formula 1;
   (3) preparing an aqueous phosphoric acid solution having a pH of 6 to 12;
   (4) preparing a mixed solution by mixing the iron oxyhydroxynitrate of Formula 1 obtained in step (2) with the aqueous phosphoric acid solution having a pH of 6 to 12; and
   (5) recovering and drying solid material after a reaction of the mixed solution is completed:

$FeO(NO_3)_x(OH)_{1-x}$ wherein $0<x<1$. [Formula 1]

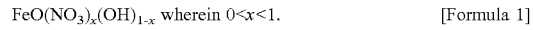

5. The method for preparing the iron oxyhydroxynitrate with hydrogen phosphate ions adsorbed on its surface according to claim 4, wherein a concentration of the $Fe(NO_3)_3 \cdot 9H_2O$ solution in step (1) is 0.5 to 2.5M.

6. The method for preparing the iron oxyhydroxynitrate with hydrogen phosphate ions adsorbed on its surface according to claim 4, wherein the aqueous solvent and the organic solvent of step (1) are mixed in a weight ratio of 30:70 to 70:30.

7. The method for preparing the iron oxyhydroxynitrate with hydrogen phosphate ions adsorbed on its surface according to claim 4, wherein a concentration of the aqueous phosphoric acid solution in step (3) is $1 \times 10^{-5}$ to $1 \times 10^{-1}$ M.

8. The method for preparing the iron oxyhydroxynitrate with hydrogen phosphate ions adsorbed on its surface according to claim 4, wherein the iron oxyhydroxynitrate of Formula 1 is present in an amount of 10 to 80% by weight with respect to a total weight of the mixed solution in step (4).

9. The method for preparing the iron oxyhydroxynitrate with hydrogen phosphate ions adsorbed on its surface according to claim 4, further comprising:
after step (4), a step of re-adjusting the pH of the mixed solution to 6 to 12.

10. A positive electrode for a lithium secondary battery comprising a positive electrode current collector; and a positive electrode active material layer located on at least one side of the positive electrode current collector,
wherein the positive electrode active material layer comprises a positive electrode active material, an electrically conductive material, a binder and an additive,
wherein the binder contains a carboxylate group, and
wherein the additive comprises the modified iron oxyhydroxynitrate of claim 1.

11. The positive electrode for a lithium secondary battery according to claim 10, wherein the additive is present in an amount of 0.1 to 40 parts by weight relative to 100 parts by weight of base solid material included in the positive electrode active material layer.

12. The positive electrode for a lithium secondary battery according to claim 10, wherein the positive electrode active material comprises at least one selected from the group consisting of elemental sulfur ($S_8$), organic sulfur compounds, and sulfur-carbon composite.

13. A lithium secondary battery comprising a positive electrode; a negative electrode; a separator interposed between the positive electrode and the negative electrode; and an electrolyte solution, wherein the positive electrode is the positive electrode of claim 10.

14. The lithium secondary battery according to claim 13, wherein the lithium secondary battery is a lithium-sulfur battery.

15. The positive electrode for a lithium secondary battery according to claim 10, wherein the binder is at least one selected from the group consisting of poly(vinyl)acetate, poly(methyl methacrylate), poly(ethyl acrylate), carboxymethyl cellulose, polyethylene glycol diacrylate, blends thereof, and copolymers thereof.

* * * * *